(12) United States Patent
Nagata et al.

(10) Patent No.: US 12,333,279 B2
(45) Date of Patent: Jun. 17, 2025

(54) PROGRAM EXECUTING DEVICE, PROGRAM EXECUTING METHOD, AND NON-TRANSITORY COMPUTER-READABLE STORAGE MEDIUM

(71) Applicant: OMRON CORPORATION, Kyoto (JP)

(72) Inventors: Kohei Nagata, Kyoto (JP); Takashi Ijiri, Kyoto (JP); Shohei Nakaoka, Kyoto (JP)

(73) Assignee: OMRON CORPORATION, Kyoto (JP)

( * ) Notice: Subject to any disclaimer, the term of this patent is extended or adjusted under 35 U.S.C. 154(b) by 246 days.

(21) Appl. No.: 17/780,755

(22) PCT Filed: Dec. 1, 2020

(86) PCT No.: PCT/JP2020/044660
§ 371 (c)(1),
(2) Date: May 27, 2022

(87) PCT Pub. No.: WO2021/131531
PCT Pub. Date: Jul. 1, 2021

(65) Prior Publication Data
US 2022/0413810 A1    Dec. 29, 2022

(30) Foreign Application Priority Data

Dec. 27, 2019 (JP) ................. 2019-238145

(51) Int. Cl.
*G06F 8/34* (2018.01)
*G06F 8/38* (2018.01)
*G06F 9/50* (2006.01)

(52) U.S. Cl.
CPC .................. *G06F 8/34* (2013.01); *G06F 8/38* (2013.01); *G06F 9/5038* (2013.01)

(58) Field of Classification Search
CPC ..................................... G06F 8/34; G06F 8/38
See application file for complete search history.

(56) References Cited

U.S. PATENT DOCUMENTS

2012/0180028 A1* 7/2012 Saji ..................... G06F 11/3664
717/132
2013/0007697 A1 1/2013 Maeno
(Continued)

FOREIGN PATENT DOCUMENTS

JP    11-143701 A    5/1999
JP    11-296357 A    10/1999
(Continued)

OTHER PUBLICATIONS

International Search Report for PCT/JP2020/044660 dated Feb. 22, 2021.
(Continued)

*Primary Examiner* — Duy Khuong T Nguyen
(74) *Attorney, Agent, or Firm* — Sughrue Mion, PLLC

(57) ABSTRACT

Template data indicates at least one designated processing item, first execution order of at least one designated processing item, and an insertion position at which insertion of a new processing item is permitted in a first flow in which at least one designated processing item is arranged according to the first execution order. Additional data indicates at least one additional processing item and second execution order of the at least one additional processing item. A program executing unit executes a program in which a second flow in which at least one additional processing item is arranged according to second execution order is inserted into the insertion position in the first flow based on the template data and the additional data. Thus, a desired program can be easily executed using a common flow and an individual flow.

13 Claims, 26 Drawing Sheets

(56) References Cited

U.S. PATENT DOCUMENTS

2014/0304637 A1* 10/2014 Ijiri .......................... G06T 1/20
715/771
2015/0220799 A1* 8/2015 Ijiri .................. G05B 19/41875
382/141

FOREIGN PATENT DOCUMENTS

| JP | 2002-144385 A | 5/2002 |
| JP | 2006-285754 A | 10/2006 |
| JP | 2009-116377 A | 5/2009 |
| JP | 2016-126721 A | 7/2016 |
| JP | 2017-220107 A | 12/2017 |
| WO | 2011/108193 A1 | 9/2011 |

OTHER PUBLICATIONS

Written Opinion for PCT/JP2020/044660 dated Feb. 22, 2021.
Japanese Office Action dated May 9, 2023 in Application No. 2019-238145.

* cited by examiner

FIG.6

PARAMETER SETTING
0. CAMERA IMAGE INPUT

| TYPE | VALUE | CHANGE PROPRIETY |
|---|---|---|
| ShutterSpeed | 2000 | CAN BE CHANGED |
| Gain | 50 | CAN BE CHANGED |

FIG.7

| | Unit Number 10a | Unit Identification Name 10b | Unit ID 10c | Parameter Identification Name 10d | Setting Value 10e | Change Propriety 10f |
|---|---|---|---|---|---|---|
| 14_0(14) | 0 | CAMERA IMAGE INPUT | 0 | ShutterSpeed | 2000 | CAN BE CHANGED |
| | | | | Gain | 50 | CAN BE CHANGED |
| 14_0(14) | 1 | SEARCH | 1 | LowerX | 45 | CANNOT BE CHANGED |
| | | | | LowerY | 60 | CAN BE CHANGED |
| 14_2(14) | 2 | POSITION COMPENSATION | 5 | ... | ... | CANNOT BE CHANGED |
| 14_3(14) | 3 | Freeblock | 90 | NOTHING | | |
| 14_3(14) | 4 | FreeblockEnd | 91 | NOTHING | | |
| 14_0(14) | 5 | CALCULATION | 12 | ... | ... | CANNOT BE CHANGED |
| 14_0(14) | 6 | RESULT OUTPUT (I/O) | 15 | NOTHING | | |

| | DATA TYPE | UNIT NUMBER 20b | UNIT IDENTIFICATION NAME 20c | UNIT ID 20d | PARAMETER IDENTIFICATION NAME 20e | SETTING VALUE 20f | SETTING CHANGE PROPRIETY 20g |
|---|---|---|---|---|---|---|---|
| 24_0 | INDIVIDUAL PARAMETER | | CAMERA IMAGE INPUT | 0 | ShutterSpeed | 1000 | |
| 24_0 | INDIVIDUAL PARAMETER | | CAMERA IMAGE INPUT | 0 | Gain | 40 | |
| 24_0 | INDIVIDUAL PARAMETER | | SEARCH | 1 | LowerY | 45 | |
| 24_1 | ADDITION | 0 | Freeblock | 90 | | | |
| 24_2 | | 1 | BACKGROUND SUPPRESSION | 20 | Upper | 50 | CANNOT BE CHANGED |
| 24_2 | | | LABELING | 21 | Color | 210 | CAN BE CHANGED |

| UNIT NUMBER | UNIT TYPE | UNIT ID | PARAMETER IDENTIFICATION NAME | SETTING VALUE |
|---|---|---|---|---|
| 0 | CAMERA IMAGE INPUT | 0 | ShutterSpeed | 2000→1000 |
| | | | Gain | 50→40 |
| 1 | SEARCH | 1 | LowerX | 45 |
| | | | LowerY | 60→45 |
| 2 | POSITION CONPENSATION | 5 | ... | ... |
| 3 | Freeblock | 90 | | |
| 4 | BACKGROUND SUPPRESSION | 20 | Upper | 50 |
| 5 | LABELING | 21 | Color | 210 |
| 6 | FreeblockEnd | 91 | | |
| 7 | CALCULATION | 12 | ... | ... |
| 8 | RESULT OUTPUT | 15 | NOTHING | |

FIG.13

| | UNIT NUMBER 10a | UNIT IDENTIFICATION NAME 10b | UNIT ID 10c | PARAMETER IDENTIFICATION NAME 10d | SETTING VALUE 10e | CHANGE PROPRIETY 10f |
|---|---|---|---|---|---|---|
| i4_0 | 0 | CAMERA IMAGE INPUT | 0 | ShutterSpeed | 2000 | CAN BE CHANGED |
| | | | | Gain | 50 | CAN BE CHANGED |
| i4_2 | 1 | Freeblock (PREPROCESSING) | 90 | | | |
| i4_3 | 2 | FreeblockEnd | 91 | | | |
| i4_2 | 3 | Freeblock (DETECTION) | 90-1 | | | |
| i4_3 | 4 | FreeblockEnd | 91-1 | | | |
| i4_0 | 5 | UNIT MACRO | 50 | NOTHING | | |
| i4_2 | 6 | Freeblock (OUTPUT) | 90-2 | | | |
| i4_3 | 7 | FreeblockEnd | 91-2 | | | |

| DATA TYPE | UNIT NUMBER | UNIT IDENTIFICATION NAME | UNIT ID | PARAMETER IDENTIFICATION NAME | SETTING VALUE | CHANGE PROPRIETY |
|---|---|---|---|---|---|---|
| INDIVIDUAL PARAMETER | | CAMERA IMAGE INPUT | 0 | ShutterSpeed | 1000 | |
| INDIVIDUAL PARAMETER | | CAMERA IMAGE INPUT | 0 | Gain | 40 | |
| ADDITION | 0 | Freeblock (PREPROCESSING) | 90 | | ... | ... |
| | 1 | SEARCH | 1 | | ... | ... |
| | | POSITION COMPENSATION | 5 | | ... | ... |
| ADDITION | 0 | Freeblock (DETECTION) | 90-1 | | ... | ... |
| | | SCAN EDGE POSITION | 30 | | ... | ... |
| ADDITION | 0 | Freeblock (OUTPUT) | 90-2 | | ... | ... |
| | | CALCULATION | 12 | | ... | ... |
| | 1 | RESULT OUTPUT (I/O) | 15 | | ... | ... |

FIG.19

| | DATA TYPE 50a | UNIT NUMBER 50b | UNIT IDENTIFICATION NAME 50c | UNIT ID 50d | PARAMETER IDENTIFICATION NAME 50e | SETTING VALUE 50f | CHANGE PROPRIETY 50g |
|---|---|---|---|---|---|---|---|
| 54_0 | INDIVIDUAL PARAMETER | | CAMERA IMAGE INPUT | 0 | ShutterSpeed | 1000 | |
| 54_0 | INDIVIDUAL PARAMETER | | CAMERA IMAGE INPUT | 0 | Gain | 40 | |
| 54_1 | ADDITION | | Freeblock (OUTPUT) | 90-1 | | | |
| 54_2 | | 0 | CALCULATION | 12 | ⋮ | ⋮ | ⋮ |
| 54_2 | | 1 | RESULT OUTPUT (I/O) | 15 | ⋮ | ⋮ | ⋮ |

| DATA TYPE 20a | UNIT NUMBER 20b | UNIT IDENTIFICATION NAME 20c | UNIT ID 20d | PARAMETER IDENTIFICATION NAME 20e | SETTING VALUE 20f | CHANGE PROPRIETY 20g |
|---|---|---|---|---|---|---|
| INDIVIDUAL PARAMETER | | CAMERA IMAGE INPUT | 0 | ShutterSpeed | 1000 | |
| INDIVIDUAL PARAMETER | | CAMERA IMAGE INPUT | 0 | Gain | 40 | |
| ADDITION | 0 | Freeblock (PREPROCESSING) | 90 | | | |
| | 1 | SEARCH | 1 | ... | ... | ... |
| | 1 | POSITION COMPENSATION | 5 | ... | ... | ... |

| | DATA TYPE (50a) | UNIT NUMBER (50b) | UNIT IDENTIFICATION NAME (50c) | UNIT ID (50d) | PARAMETER IDENTIFICATION NAME (50e) | SETTING VALUE (50f) | CHANGE PROPRIETY (50g) |
|---|---|---|---|---|---|---|---|
| 54_0 ⎫ 55 | INDIVIDUAL PARAMETER | | CAMERA IMAGE INPUT | 0 | ShutterSpeed | 1000 | |
| 54_0 ⎭ | INDIVIDUAL PARAMETER | | CAMERA IMAGE INPUT | 0 | Gain | 40 | |
| 54_1 | ADDITION | | Freeblock (PREPROCESSING) | 90 | | | |
| 54_2 ⎫ 56 | | 0 | SEARCH | 1 | ... | ... | ... |
| 54_2 ⎭ | | 1 | POSITION COMPENSATION | 5 | ... | ... | ... |
| 54_1 ⎫ | ADDITION | | Freeblock (OUTPUT) | 90-1 | | | |
| 54_3 ⎬ 57 | | 0 | Freeblock (ARITHMETIC OPERATION) | 90-2 | | | |
| 54_4 ⎭ | | 1 | FreeblockEnd | 91-2 | | | |
| 54_2 | | 2 | RESULT OUTPUT (I/O) | 15 | ... | ... | ... |

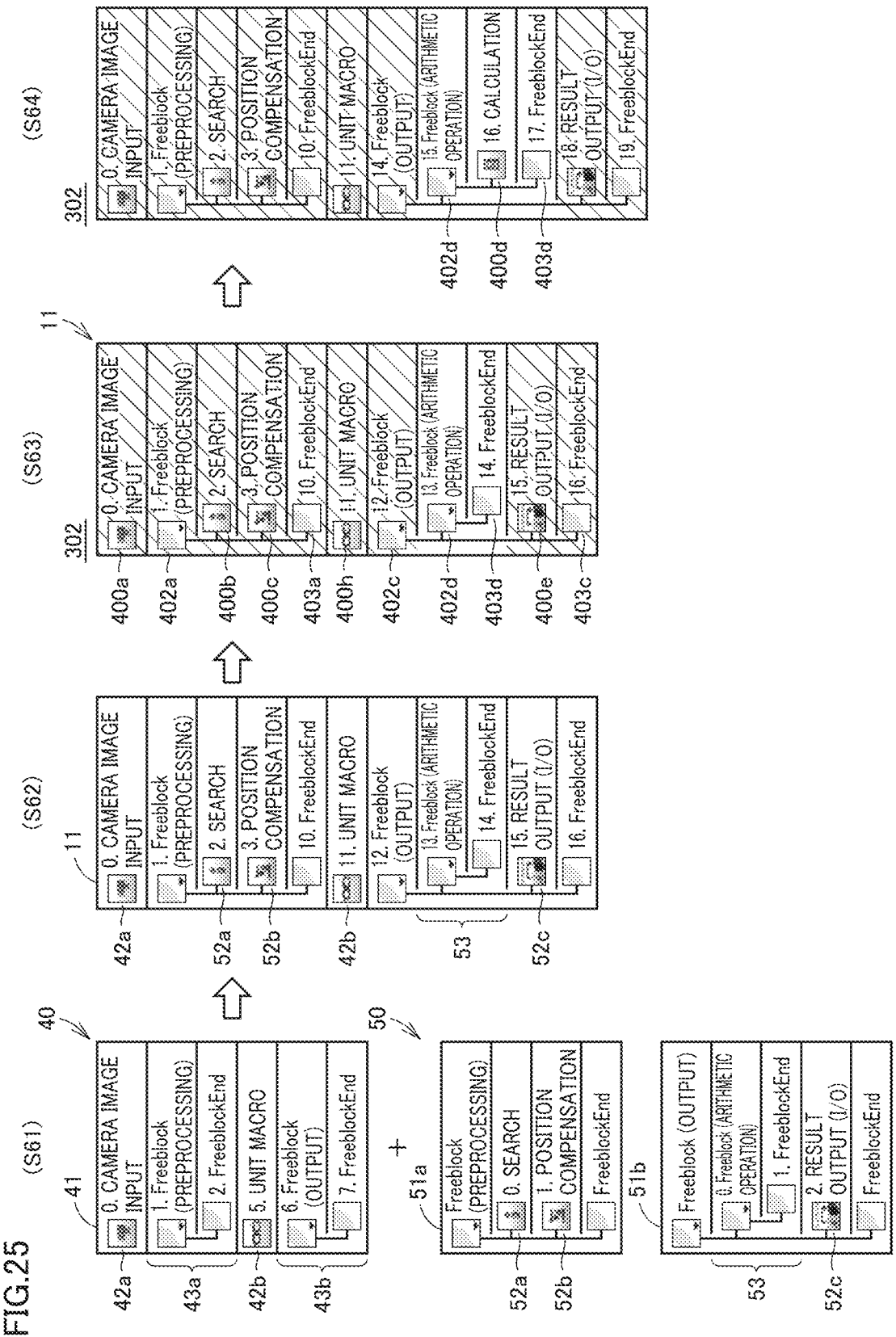

FIG.26

| | DATA TYPE | UNIT NUMBER | UNIT IDENTIFICATION NAME | UNIT ID | PARAMETER IDENTIFICATION NAME | SETTING VALUE | CHANGE PROPRIETY |
|---|---|---|---|---|---|---|---|
| 24_0 | INDIVIDUAL PARAMETER | | CAMERA IMAGE INPUT | 0 | ShutterSpeed | 1000 | |
| 24_0 | INDIVIDUAL PARAMETER | | CAMERA IMAGE INPUT | 0 | Gain | 40 | |
| 24_1 | | | Freeblock (ARITHMETIC OPERATION) | 90-2 | ... | ... | ... |
| 24_2 | ADDITION | 0 | CALCULATION | 12 | | | |

PROGRAM EXECUTING DEVICE, PROGRAM EXECUTING METHOD, AND NON-TRANSITORY COMPUTER-READABLE STORAGE MEDIUM

CROSS REFERENCE TO RELATED APPLICATIONS

This application is a National Stage of International Application No. PCT/JP2020/044660 filed Dec. 1, 2020, claiming priority based on Japanese Patent Application No. 2019-238145 filed Dec. 27, 2019, the contents of each of which being herein incorporated by reference in their entireties.

TECHNICAL FIELD

The present disclosure relates to a program executing device, a program executing method, and a program.

BACKGROUND ART

In a Factory Automation (FA) field, a technique for automatically inspecting an inspection object such as a workpiece has become widespread. Processing for inspecting the workpiece is implemented by a combination of various processing items. An application that provides a user interface setting such the combination of processing items by the user itself has been developed.

For example, WO 2011/108193 (PTL 1) discloses a programming support apparatus that produces an application program using a basic program management table and an individual requirement management table. The basic program management table manages a plurality of program streams constituting a basic program common to users. The individual requirement management table manages a program stream implementing an individual requirement that can be defined for each user. The programming support apparatus causes a program developer to designate and accept positions of the plurality of program streams of the basic program as insertion positions into which the individual requirements are inserted.

CITATION LIST

Patent Literature

PTL 1: WO 2011/108193

SUMMARY OF INVENTION

Technical Problem

Usually, a plurality of programs inspecting works of a plurality of similar types has a common flow and an individual flow produced for each type. Using the technique described in PTL 1, it is possible to create the basic program corresponding to the common flow can be produced, and the program stream implementing the individual requirement for each type can be produced separately from the basic program. Thus, the program for each type is easy to produce.

However, in the technique described in PTL 1, the position where the individual requirement is inserted in the plurality of program streams constituting the basic program can be freely set. For this reason, the individual requirement may be erroneously inserted into an unintended position. As a result, a program different from the desired program can be executed.

The present disclosure has been made in view of the above problems, and an object of the present disclosure is to provide a program executing device, a program executing method, and a program capable of easily executing a desired program using a common flow and an individual flow.

Solution to Problem

According to an example of the present disclosure, a program executing device includes an acquisition unit that acquires first template data. The first template data indicates at least one designated processing item, first execution order of at least one designated processing item, and a first insertion position at which insertion of a new processing item is permitted in a first flow in which at least one designated processing item is arranged according to the first execution order. The program executing device includes a production unit and a program executing unit. The production unit produces first additional data indicating at least one additional processing item and second execution order of the at least one additional processing item. The program executing unit executes a program in which a second flow in which at least one additional processing item is arranged according to the second execution order is inserted into the first insertion position in the first flow based on the template data and the additional data.

According to this disclosure, the first template data indicates the first insertion position in the first flow. The second flow is inserted into the first insertion position. Accordingly, the second flow can be prevented from being erroneously inserted into a position other than the first insertion position. That is, the first flow other than the first insertion position is not edited, but is executed as it is. For example, the first flow can be set as a flow common to a plurality of types. For example, the second flow can be set as an individual flow produced for each type. Thus, a desired image processing program can be easily executed using the first flow (common flow) and the second flow (individual flow).

In the above disclosure, the first template data further indicates a default value and change propriety from the default value for at least one parameter needed for the execution of at least one designated processing items. The first additional data further indicates a changed value for the parameter that can be changed from the default value in the at least one parameter. The program executing unit uses the value indicated by the first additional data for the parameter that can be changed from the default value.

According to this disclosure, when not desire the change from the default value, a user produces the first template data that prohibits the change from the default value, so that the user can always execute the designated processing item using the default value. In addition, the parameter that can be changed from the default value can be appropriately changed to the value suitable for the type.

In the above disclosure, the first template data indicates the range of the value that can be set for the parameter that can be changed from the default value. The first additional data indicates a value within the range for the parameter that can be changed from the default value. According to this disclosure, the value outside a settable range can be prevented from being erroneously set.

In the above disclosure, the first template data is configured of second template data and second additional data. The second template data indicates at least one first designated processing item, third execution order of at least one first designated processing item, and N second insertion positions at which insertion of a new processing item is permitted in a third flow in which at least one first designated processing item is arranged according to the third execution order. The second additional data indicates the M second insertion positions selected from the N second insertion positions and fourth execution order of at least one second designated processing item and the at least one second designated processing item for each of the M second insertion positions. N is an integer greater than or equal to 2, and M is a positive integer less than N. The first template data indicates at least one first designated processing item and at least one second designated processing item as at least one designated processing item. The first template data indicates execution order of at least one first designated processing item and at least one second designated processing item as first execution order when a fourth flow in which at least one corresponding second designated processing item is arranged according to corresponding fourth execution order is inserted into each of the M second insertion positions in the third flow. The first template data indicates an unselected second insertion position in the N second insertion positions as the first insertion position when the fourth flow is inserted into each of the M second insertion positions in the third flow.

Alternatively, the second template data indicates at least one first designated processing item, third execution order of at least one first designated processing item, and the second insertion position at which insertion of a new processing item is permitted in a third flow in which at least one first designated processing item is arranged according to the third execution order. The second additional data indicates at least one second designated processing item, fourth execution order of the at least one second designated processing item, and a third insertion position at which insertion of a new processing item is permitted in the fourth flow in which at least one second designated processing item is arranged according to the fourth execution order. The first template data indicates at least one first designated processing item and at least one second designated processing item as at least one designated processing item. The first template data indicates execution order of at least one first designated processing items and at least one second designated processing items as first execution order when the fourth flow is inserted at the second insertion position in the third flow. The first template data indicates the third insertion position as the first insertion position when the fourth flow is inserted at the second insertion position in the third flow.

According to these disclosures, when the second template data is already produced, the first template data can be easily produced by producing the second additional data. In addition, production work of the program can be shared by a plurality of users. For example, a first user may produce the second template data, a second user may produce the second additional data, and a third user may produce the first additional data.

The acquisition unit provides a user interface that receives designation of selection of the at least one designated processing item from a plurality of previously-prepared processing items, the first execution order, and the first insertion position, and produces the first template data according to input to the user interface.

According to this disclosure, the user can easily produce the first template data defining the desired first flow by operating the user interface.

In the above disclosure, the acquisition unit displays the plurality of objects on the user interface. The plurality of objects include a first object corresponding to each of the plurality of previously-prepared processing items, and a second object different from the first object. The user interface includes a work region where objects selected from the plurality of objects are disposed in designated order. The acquisition unit sets at least one designated processing items based on the processing item corresponding to the first object disposed in the work region. The acquisition unit sets the first execution order based on the order of the first objects disposed in the work region. The acquisition unit sets the first insertion position based on the order of the second object disposed in the work region.

According to this disclosure, the user can easily set the designated processing item constituting the first flow and the first execution order thereof by selecting and disposing the first object. Furthermore, the user can easily set the first insertion position by disposing the second object in the first flow.

In the above disclosure, the acquisition unit acquires the second template data. The second template data indicates at least one first designated processing item, third execution order of at least one first designated processing item, and N second insertion positions at which insertion of a new processing item is permitted in a third flow in which at least one first designated processing item is arranged according to the third execution order. The acquisition unit displays a plurality of objects corresponding to a plurality of previously-prepared processing items on the user interface. The user interface includes a work region where the objects selected from the plurality of objects are disposed in designated order for each of the M second insertion positions selected from the N second insertion positions. N is an integer greater than or equal to 2, and M is a positive integer less than N. The acquisition unit sets at least one second designated processing item based on the processing item corresponding to the object disposed in the work region for each of the M second insertion positions. The acquisition unit sets the fourth execution order of at least one second designated processing item based on the order of the object disposed in the work region for each of the M second insertion positions. The acquisition unit produces the second additional data indicating at least one second designated processing items and the fourth execution order for each of the M second insertion positions. The acquisition unit produces the first template data that is configured of the second template data and the second additional data. The first template data indicates at least one first designated processing item and at least one second designated processing item as at least one designated processing item. The first template data indicates execution order of at least one first designated processing item and at least one second designated processing item as first execution order when a fourth flow in which the corresponding at least one second designated processing item is arranged according to the corresponding fourth execution order is inserted into each of the M second insertion positions in the third flow. The first template data indicates an unselected second insertion position in the N second insertion positions as the first insertion position when the corresponding fourth flow is inserted into each of the M second insertion positions in the third flow.

According to this disclosure, the user can easily produce the first template data by setting the fourth flow using the object.

Alternatively, the second template data indicates at least one first designated processing item, third execution order of at least one first designated processing item, and the second insertion position at which insertion of a new processing item is permitted in a third flow in which at least one first designated processing item is arranged according to the third execution order. The acquisition unit displays a plurality of objects on the user interface. The plurality of objects include a first object corresponding to each of the plurality of previously-prepared processing items, and a second object different from the first object. The user interface includes a work region where objects selected from the plurality of objects are disposed in designated order. The acquisition unit sets at least one second designated processing items based on the processing item corresponding to the first object disposed in the work region. The acquisition unit sets the fourth execution order of at least one second designated processing items based on the order of the first object disposed in the work region.

The acquisition unit sets a third insertion position at which insertion of a new processing item is permitted in the fourth flow in which at least one second designated processing item is arranged according to the fourth execution order based on the order of the second object disposed in the work region. The acquisition unit produces the second additional data indicating at least one second designated processing item, the fourth execution order, and the third insertion position. The acquisition unit produces the first template data that is configured of the second template data and the second additional data. The first template data indicates at least one first designated processing item and at least one second designated processing item as at least one designated processing item. The first template data indicates execution order of at least one first designated processing items and at least one second designated processing items as first execution order when the fourth flow is inserted at the second insertion position in the third flow. The first template data indicates the third insertion position as the first insertion position when the fourth flow is inserted at the second insertion position in the third flow.

According to this disclosure, the user can easily produce the first template data by setting the fourth flow inserted into the insertion position of the third flow defined by the second template data using the first object and the second object.

According to another example of the present disclosure, a program executing method includes acquiring template data indicating at least one designated processing item, first execution order of the at least one designated processing item, and a first insertion position at which insertion of a new processing item is permitted in a first flow in which the at least one designated processing item is arranged according to the first execution order. The program executing method includes producing additional data indicating at least one additional processing item and second execution order of the at least one additional processing item. A program executing method includes executing a program in which a second flow in which the at least one additional processing item is arranged according to the second execution order is inserted at the first insertion position in the first flow based on the template data and the additional data.

According to still another example of the present disclosure, a program causes a computer to execute the control method. According to these disclosures, the desired program can be easily executed using the common flow and the individual flow.

Advantageous Effects of Invention

According to the present disclosure, the desired program can be easily executed using the common flow and the individual flow.

BRIEF DESCRIPTION OF DRAWINGS

FIG. 6 is a view illustrating an example of a window setting a value of a parameter.

FIG. 7 is a view illustrating an example of the template data 10 of the embodiment.

FIG. 9 is a view illustrating an example of the additional data 20 of the embodiment.

FIG. 13 is a view illustrating an example of the template data 10 according to a first modification.

FIG. 15 is a view illustrating an example of the additional data 20 of the first modification.

FIG. 19 is a view illustrating an example of the additional data 50 of the second modification.

FIG. 22 is a view illustrating an example of the additional data 20 for the template data 10.

FIG. 24 is a view illustrating an example of the additional data 50 of the third modification.

FIG. 25 is a view illustrating a flow of a method for producing additional data 20 of the third modification.

FIG. 26 is a view illustrating an example of the additional data 20 of the third modification.

DESCRIPTION OF EMBODIMENT

Figure 1:
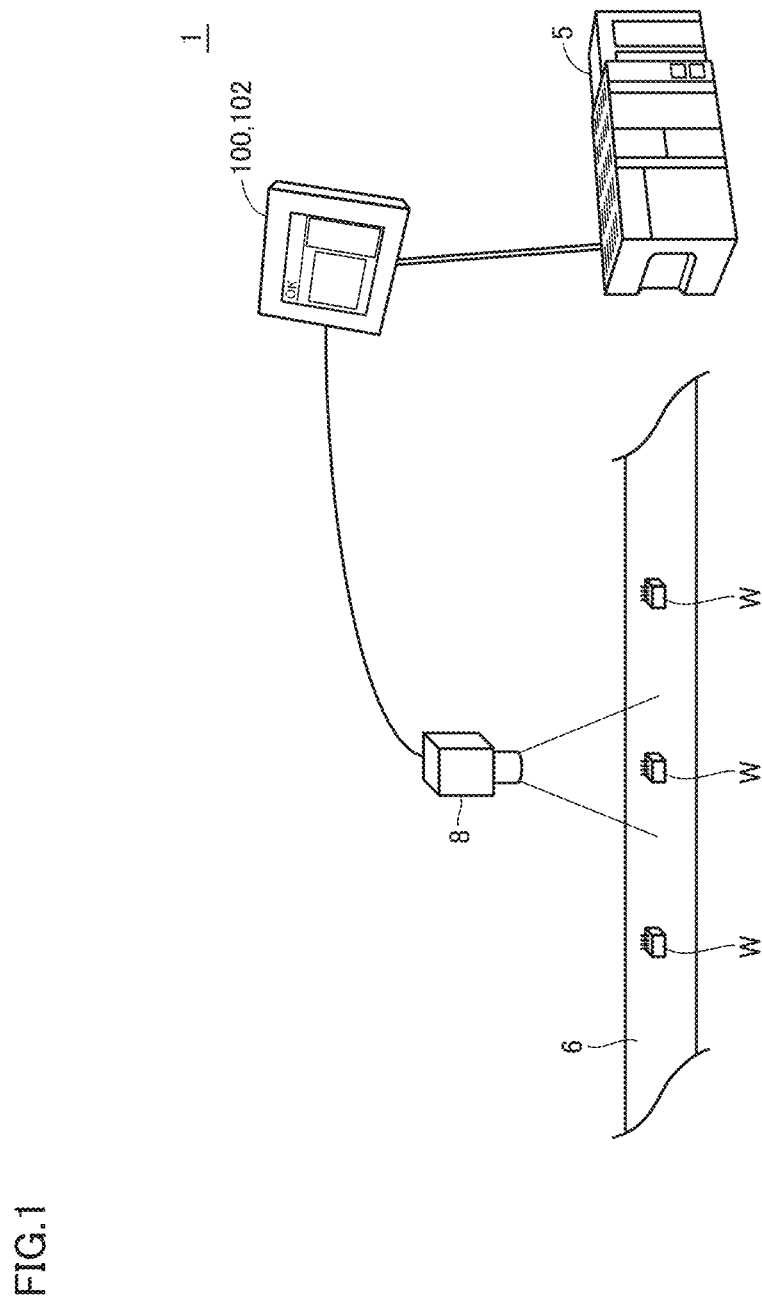
FIG. 1 is a schematic diagram illustrating an overall configuration of an image processing system including an image processing device according to an embodiment.

With reference to the drawings, an embodiment of the present invention will be described in detail. The same or equivalent portion in the drawings is denoted by the same reference numeral, and the description will not be repeated. The following modifications described below may selectively be combined as appropriate.

§ 1 Application Example

Figure 2:
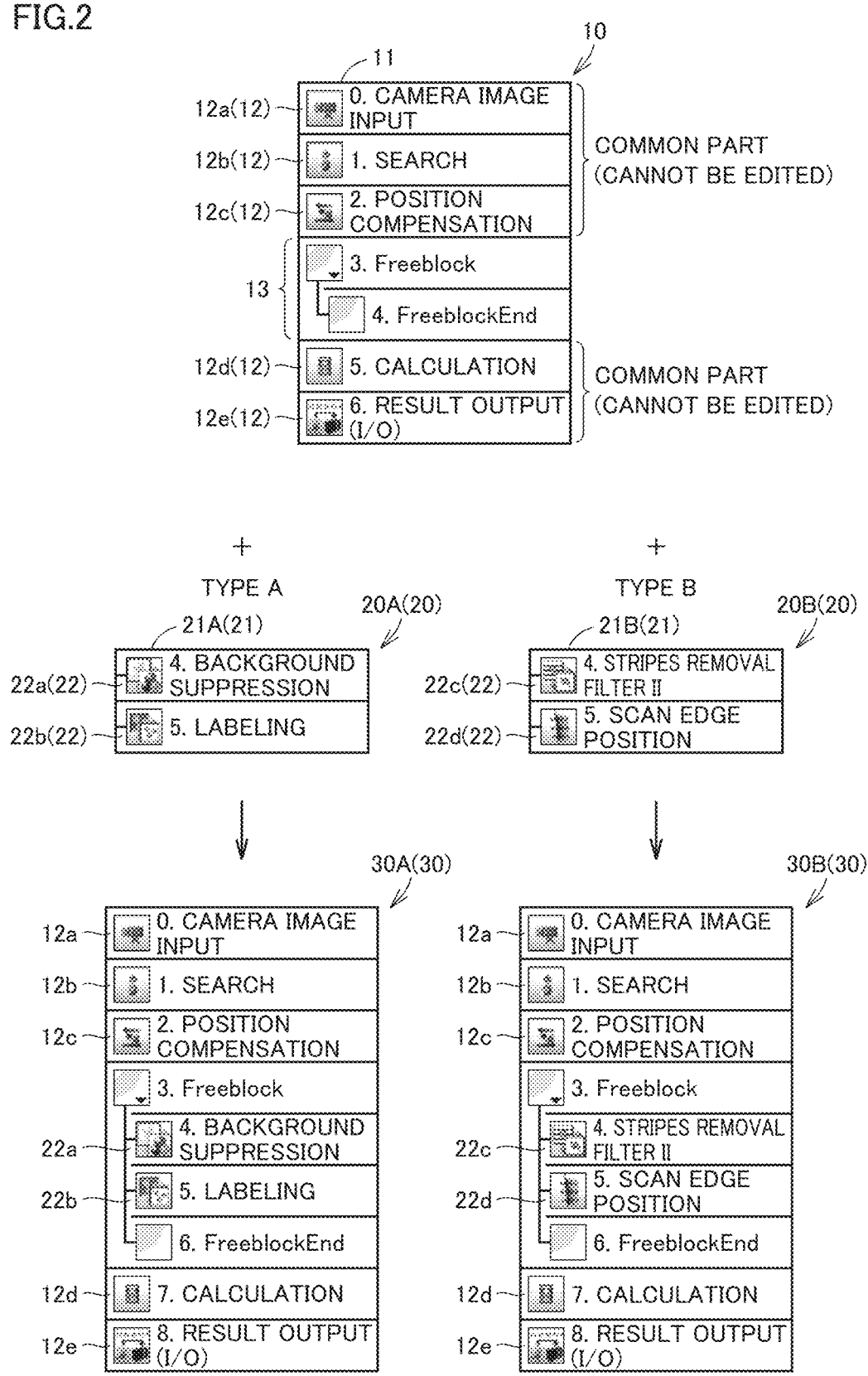
FIG. 2 is a view illustrating an example of a method for executing an image processing program in the image processing device.

With reference to FIGS. 1 and 2, an application example of the present invention will be described. In the application example, an image processing device that executes an image processing program inspecting a workpiece will be described as an example of a program executing device. However, the program executing device is not limited to the image processing device. For example, the program executing device may be a device that executes various programs such as a programmable logic controller (PLC).

FIG. 1 is a schematic diagram illustrating an overall configuration of an image processing system including the image processing device of the embodiment. As illustrated in FIG. 1, an image processing system 1 includes an image processing device 100 also referred to as a visual sensor, an imaging unit 8 connected to the image processing device 100, and a programmable logic controller (PLC) 5 capable of communicating with the image processing device 100 as main components. The image processing device 100 integrally configured with a display 102 will be described as an example.

The image processing device 100 is incorporated in a production line, and executes image processing such as inspection of the presence or absence of a defect or dirt on an inspection object (hereinafter, also referred to as the "workpiece W"), measurement of a size or arrangement direction of the workpiece W, and recognition of characters and figures on the surface of the workpiece W. That is, the image processing device 100 executes image processing on image data generated by imaging the workpiece W. The workpiece W is conveyed by a conveyance mechanism 6 such as a belt conveyor, and sequentially imaged by the imaging unit 8. The PLC 5 executes control of the conveyance mechanism 6 and the like in cooperation with the image processing device 100.

The imaging unit 8 includes, as main components, an imaging element divided into a plurality of pixels such as a charge coupled device (CCD) or a complementary metal oxide semiconductor (CMOS) sensor in addition to an optical system such as a lens. Image data (hereinafter, referred to as a "camera image") acquired by imaging by the imaging unit 8 is transmitted to the image processing device 100. Then, the image processing device 100 performs image processing on the camera image captured by the imaging unit 8. An illumination device that irradiates the workpiece W imaged by the imaging unit 8 with light may be further provided. The image processing device 100 may be configured such that more imaging units 8 can be connected.

When a plurality of types of workpieces W are inspected, the image processing device 100 changes the image processing program for each type. Accordingly, the user sets the image processing program for each type. However, a plurality of image processing programs respectively corresponding to a plurality of similar types usually includes a common flow (hereinafter, referred to as a "common flow"). Consequently, the image processing device 100 has a function of executing the image processing program for each type by combining the common flow and an individual flow (hereinafter, referred to as an "individual flow") set for each type. Accordingly, in a case where the common flow has been produced, the user can cause the image processing device 100 to execute the image processing program inspecting the type by setting the individual flow corresponding to the type.

FIG. 2 is a view illustrating an example of a method for executing the image processing program in the image processing device.

The image processing device 100 acquires template data 10 defining a common flow 11. The template data 10 indicates at least one designated processing item 12 and execution order of the at least one designated processing item 12. The common flow 11 is a flow in which the at least one designated processing item 12 is arranged according to the execution order. The template data 10 in FIG. 2 defines the common flow 11 in which designated processing items 12a to 12e are disposed in this order.

The template data 10 further indicates an insertion position 13 at which insertion of a new processing item is permitted in the common flow 11. The template data 10 in FIG. 2 indicates a position between the designated processing item 12c and the designated processing item 12d as the insertion position 13.

The template data 10 is previously produced by, for example, a system engineer (SE), a system integrator (also referred to as "SIer"), a vendor, or the like, and cannot be edited. Therefore, the designated processing items 12a to 12e, the execution order, and the insertion position 13 indicated by the template data 10 cannot be changed.

The image processing device 100 produces additional data 20 defining an individual flow 21 inserted into the insertion position 13 of the common flow 11. For example, the additional data 20 is produced according to input from a vendor, a production line manager, a production line worker, and the like. As illustrated in FIG. 2, the image processing device 100 produces additional data 20A defining an individual flow 21A corresponding to a type A and additional data 20B defining an individual flow 20B corresponding to a type B.

Each of the additional data 20A, 20B indicates at least one additional processing item 22 and the execution order of the at least one additional processing item 22. The individual flow 21 is a flow in which the at least one additional processing item 22 is arranged according to the execution order. The additional data 20A in FIG. 2 defines the individual flow 21A in which the additional processing items 22a, 22b are disposed in this order. The additional data 20B in FIG. 2 defines the individual flow 21B in which the additional processing items 22c, 22d are disposed in this order.

The image processing device 100 executes the image processing program 30 by combining the common flow 11 and the individual flow 21. Specifically, the image processing device 100 executes an image processing program 30A inspecting the workpiece W of the type A based on the template data 10 and the additional data 20A.

The image processing program 30A is a program in which the individual flow 21A defined by the additional data 20A is inserted into the insertion position 13 of the common flow 11 defined by the template data 10. Similarly, the image processing device 100 executes an image processing program 30B inspecting the workpiece W of the type B based on the template data 10 and the additional data 20B. The image processing program 30B is a program in which the individual flow 21B defined by the additional data 20B is inserted into the insertion position 13 of the common flow 11 defined by the template data 10.

According to the embodiment, when the template data 10 is already produced, the image processing program inspecting the workpiece W of the type is executed only by producing the additional data 20 defining the individual flow 21 corresponding to the type. That is, the image processing program including the common flow 11 does not need to be produced from scratch, and labor needed to produce the image processing program is reduced.

The individual flow 21 is inserted into the insertion position 13 indicated by the template data 10. For this reason, the individual flow 21 is not erroneously inserted into a position different from the insertion position 13 in the common flow 11. In the technique described in PTL 1, for example, in the common flow indicated by the template data 10, the insertion position is designated from six positions of the position before the designated processing item 12a, the position between the designated processing items 12a, 12b, the position between the designated processing items 12b, 12c, the position between the designated processing items 12c, 12d, the position between the designated processing items 12d, 12e, and the position after the designated processing item 12e. For this reason, although the position between the designated processing items 12c, 12d should be designated, another position can be erroneously designated. An image processing program different from the desired image processing program can be executed by the erroneous specification.

However, according to the embodiment, the template data 10 indicates the insertion position 13 in the common flow 11. Then, the individual flow 21 is inserted into the insertion position 13. For this reason, the individual flow 21 can be prevented from being erroneously inserted into the position other than the insertion position 13. Consequently, the designated processing items 12a to 12c are executed without inserting the processing item therebetween. In addition, the designated processing items 12d, 12e are executed without inserting the processing item therebetween. That is, the common flow 11 other than the insertion position 13 is not edited, but is always executed as it is. Thus, the desired image processing program can be easily executed using the common flow 11 and the individual flow 21.

§ 2 Specific Example

<A. Hardware Configuration of Image Processing Device>

Figure 3:
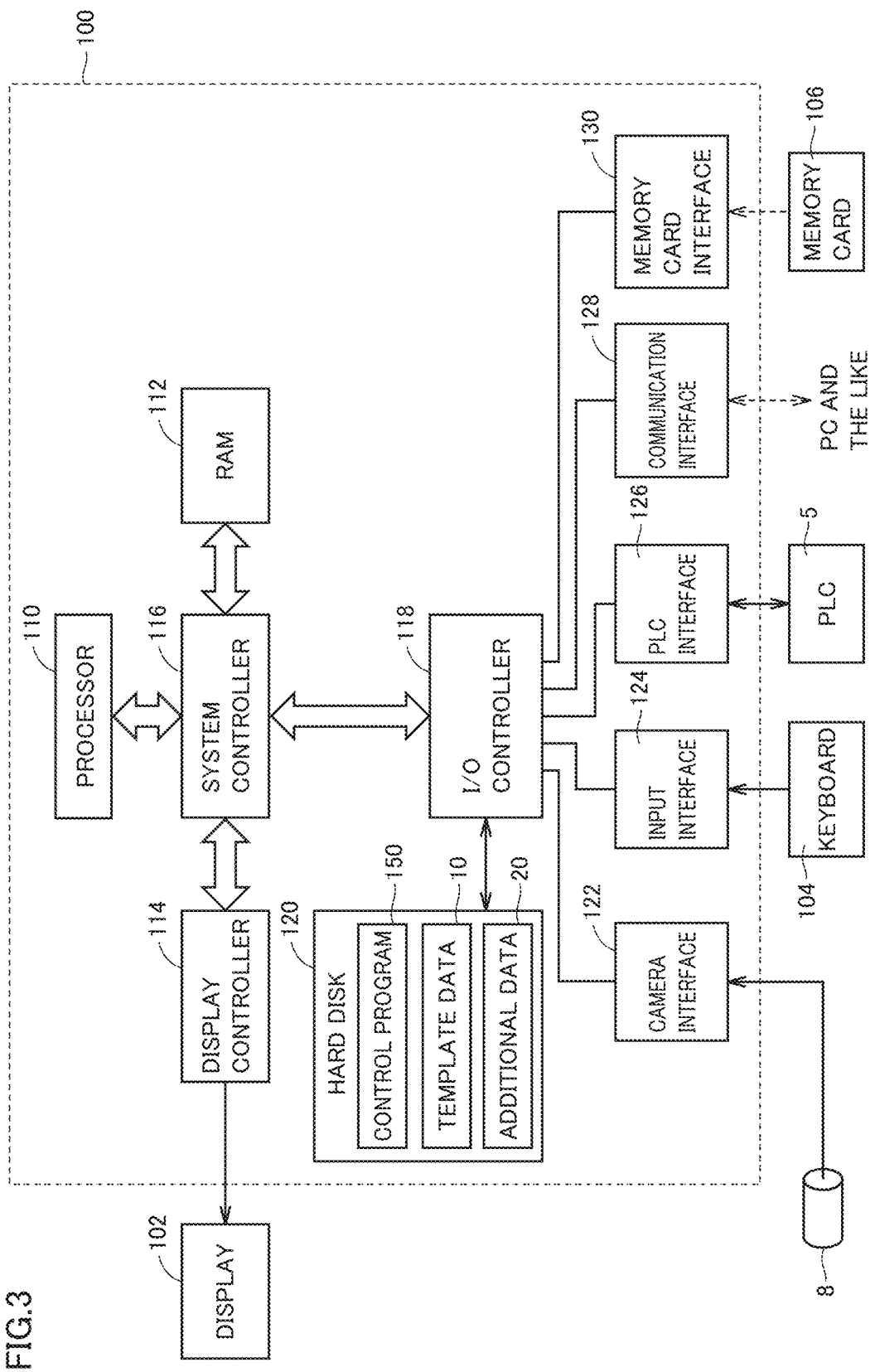
FIG. 3 is a schematic diagram illustrating a hardware configuration of the image processing device.

FIG. 3 is a schematic diagram illustrating a hardware configuration of the image processing device. As illustrated in FIG. 3, the image processing device 100 typically has a structure according to a general-purpose computer architecture, and implements various processing as described later by the processor executing the previously-installed program.

More specifically, the image processing device 100 includes a processor 110 such as a central processing unit (CPU) or a micro-processing unit (MPU), a random access memory (RAM) 112, a display controller 114, a system controller 116, an input output (I/O) controller 118, a hard disk 120, a camera interface 122, an input interface 124, a PLC interface 126, a communication interface 128, and a memory card interface 130. These units are data-communicably connected to each other around the system controller 116.

The processor 110 exchanges a program (code) and the like with the system controller 116, and executes the program and the like in a predetermined order, thereby implementing target arithmetic processing.

The system controller 116 is connected to the processor 110, the RAM 112, the display controller 114, and the I/O controller 118 through a bus, exchanges data with each unit, and controls the entire processing of the image processing device 100.

The RAM 112 is typically a volatile storage device such as a dynamic random access memory (DRAM), and holds the program read from the hard disk 120, the camera image (image data) acquired by the imaging unit 8, a processing result for the camera image, work data, and the like.

The display controller 114 is connected to the display 102, and outputs a signal in order to display various information to the display 102 according to an internal command from the system controller 116. For example, the display 102 includes a liquid crystal display, an organic electro luminescence (EL) display, an organic EL, or the like.

The I/O controller 118 controls data exchange with a recording medium or an external device connected to the image processing device 100. More specifically, the I/O controller 118 is connected to a hard disk 120, a camera interface 122, an input interface 124, a PLC interface 126, a communication interface 128, and a memory card interface 130.

The hard disk 120 is typically a nonvolatile magnetic storage device, and stores template data 10, additional data 20, and the like in addition to a control program 150 executed by the processor 110. The control program 150 installed in the hard disk 120 is distributed while stored in a memory card 106 or the like. Furthermore, a camera image is stored in the hard disk 120. A semiconductor storage device such as a flash memory or an optical storage device such as a digital versatile disk random access memory (DVD-RAM) may be adopted instead of the hard disk 120.

The camera interface 122 corresponds to an input unit that receives the image data generated by imaging the workpiece W (inspection object), and mediates data transmission between the processor 110 and the imaging unit 8. More specifically, the camera interface 122 can be connected to at least one more imaging unit 8, and an imaging instruction is output from the processor 110 to the imaging unit 8 through the camera interface 122. Thus, the imaging unit 8 images a subject and outputs the generated image to the processor 110 through the camera interface 122.

The input interface 124 mediates data transmission between the processor 110 and an input device such as a keyboard 104, a mouse, a touch panel, or a dedicated console. That is, the input interface 124 receives an operation command given by the user operating the input device.

The PLC interface 126 mediates data transmission between the processor 110 and the PLC 5. More specifically, the PLC interface 126 transmits information related to the state of the production line controlled by the PLC 5, information related to the workpiece W, and the like to the processor 110.

The communication interface 128 mediates data transmission between processor 110 and another personal computer (not illustrated), a server device, or the like. The communication interface 128 typically includes Ethernet (registered trademark), a universal serial bus (USB), or the like. As described later, instead of installing the program stored in the memory card 106 in the image processing device 100, the program downloaded from the distribution server or the like may be installed in the image processing device 100 through the communication interface 128. As an example, the communication interface 128 receives a signal indicating the state of the imaging unit 8 from the imaging unit 8, the PLC 5, or the like. The signal indicates whether the imaging unit 8 currently captures the camera image.

The memory card interface 130 mediates data transmission between the processor 110 and the memory card 106 that is the recording medium. That is, the memory card 106 is distributed while the control program 150 and the like executed by the image processing device 100 are stored in the memory card 106, and the memory card interface 130 reads the control program 150 from the memory card 106. In response to an internal command of the processor 110, the memory card interface 130 writes the camera image acquired by the imaging unit 8 and/or a processing result in the image processing device 100 into the memory card 106. The memory card 106 includes a general-purpose semiconductor storage device such as a secure digital (SD), a magnetic recording medium such as a flexible disk, an optical recording medium such as a compact disk read only memory (CD-ROM), or the like.

When the computer having the structure following the general-purpose computer architecture is used, an operating system (OS) providing a basic function of the computer may be installed in addition to the application providing the function of the embodiment. In this case, the program of the embodiment may call a required module in a predetermined order and/or timing in program modules provided as a part of the OS to execute processing. That is, the program itself of the embodiment does not include the module as described above, and sometimes the processing is executed in cooperation with the OS.

Furthermore, the control program 150 of the embodiment may be provided while incorporated in a part of another program. Also in this case, the program itself does not include modules included in another programs combined as described above, and the processing is executed in cooperation with the another program. That is, the control program 150 of the embodiment may be incorporated in such another program.

Alternatively, some or all of the functions provided by the execution of the control program 150 may be implemented as a dedicated hardware circuit.

<B. User Interface>

The image processing device 100 of the embodiment provides a user interface that receives selection of an arbitrary processing item from a plurality of previously-defined processing items. The user can produce the template data 10 and the additional data 20 by selecting and arranging an arbitrary processing item in the user interface. The processing item in the present specification is a functional unit having a specific application, and is also referred to as a "unit". A processing target and a processing result can be specified for each processing item.

The user who operates the user interface includes the SE, the SIer, the vendor, the production line manager, and the production line worker. The user who operates the user interface varies depending on a design stage of the image processing program. For example, in an initial stage of the designing of the image processing program, the SE, the SIer, the vendor, or the like operates the user interface to produce the template data 10. In to final stage of the designing of the image processing program, the vendor, the manager, the worker, or the like operates the user interface to produce the additional data 20.

Figure 4:
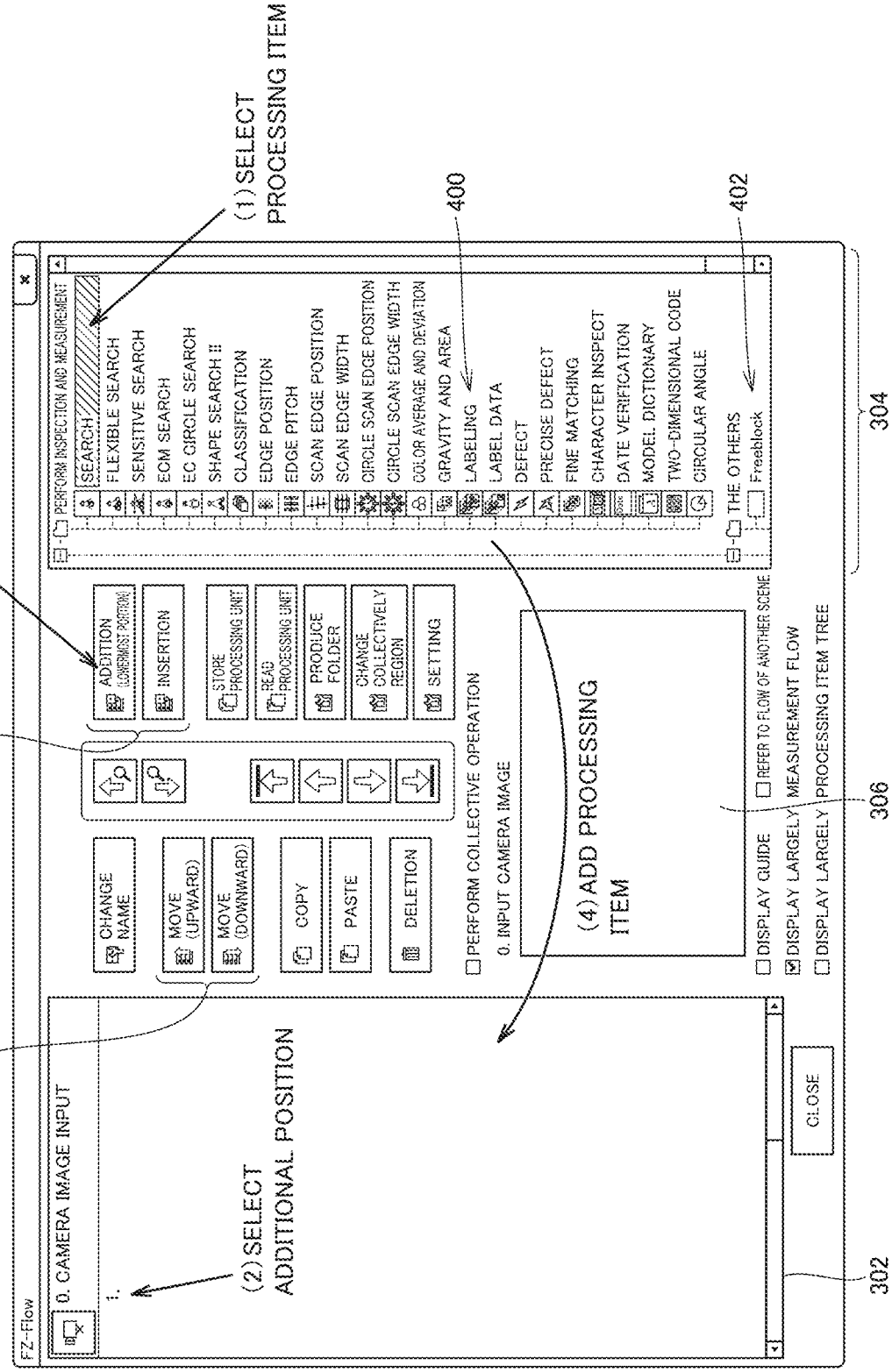
FIG. 4 is a view illustrating an example of a user interface provided by the image processing device of the embodiment.

FIG. 4 is a view illustrating an example of the user interface provided by the image processing device of the embodiment. As illustrated in FIG. 4, the image processing device 100 provides a user interface 300 receiving the designation of selection of at least one processing item used for the image processing in a plurality of previously-defined processing items and execution order of the selected processing items.

The user interface 300 includes a work region 302, an object selection region 304, a camera image display region 306, an insertion/addition button 308, and an order change button 310.

A list of a plurality of objects is displayed in the object selection region 304. The plurality of objects include an object 400 corresponding to each of the plurality of previously-prepared processing items. For example, the plurality of processing items include a processing item defining acquisition processing for acquiring the image from the imaging unit 8 (see FIG. 1) that can be connected to the image processing device 100, a processing item defining search processing for a region representing the inspection target object in the image, a processing item defining processing for labeling a pixel of a designated color in the image, and the like. The object 400 is used for setting the image processing program. In FIG. 4, the reference numeral "400" is assigned only to the object corresponding to "labeling", and the object corresponding to another processing item (for example, "search", . . . , "circle angle acquisition") is also "object 400".

Furthermore, an object 402 different from the object 400 is displayed in the object selection region 304. The object 402 is used to set the insertion position.

The user selects the desired object 400, 402 ((1) selects the processing item) in the object selection region 304 of the user interface 300, and selects the position (order) to which the selected object should be added in the work region 302 ((2) selects additional position). When the user selects the insertion/addition button 308 ((3) presses the insertion/addition button), the selected object is added to the work region 302 ((4) the object is added). The user selects the object in the work region 302 and then selects the order change button 310, so that the user can also appropriately change the disposition order of the object.

The user appropriately repeats this processing, so that the user can set the template data 10 and the additional data 20 in order to implement the target image processing program.

Then, when the template data 10 and the additional data 20 are designated, the execution of the image processing program 30 is started based on the designated template data 10 and additional data 20. More specifically, an instruction string corresponding to the image processing program 30 is generated based on the template data 10 and the additional data 20. The intended image processing is implemented by executing the instruction string in the processor. The instruction string may be a native code given to the processor, an internal command given to the OS or the middleware, or a mixture thereof.

<C. Template Data Producing Method>

A method for producing the template data 10 will be described below. For example, the template data 10 is produced according to inputs of the SE, the SIer, the vendor, and the like before the image processing device 100 is brought to the production line.

Figure 5:
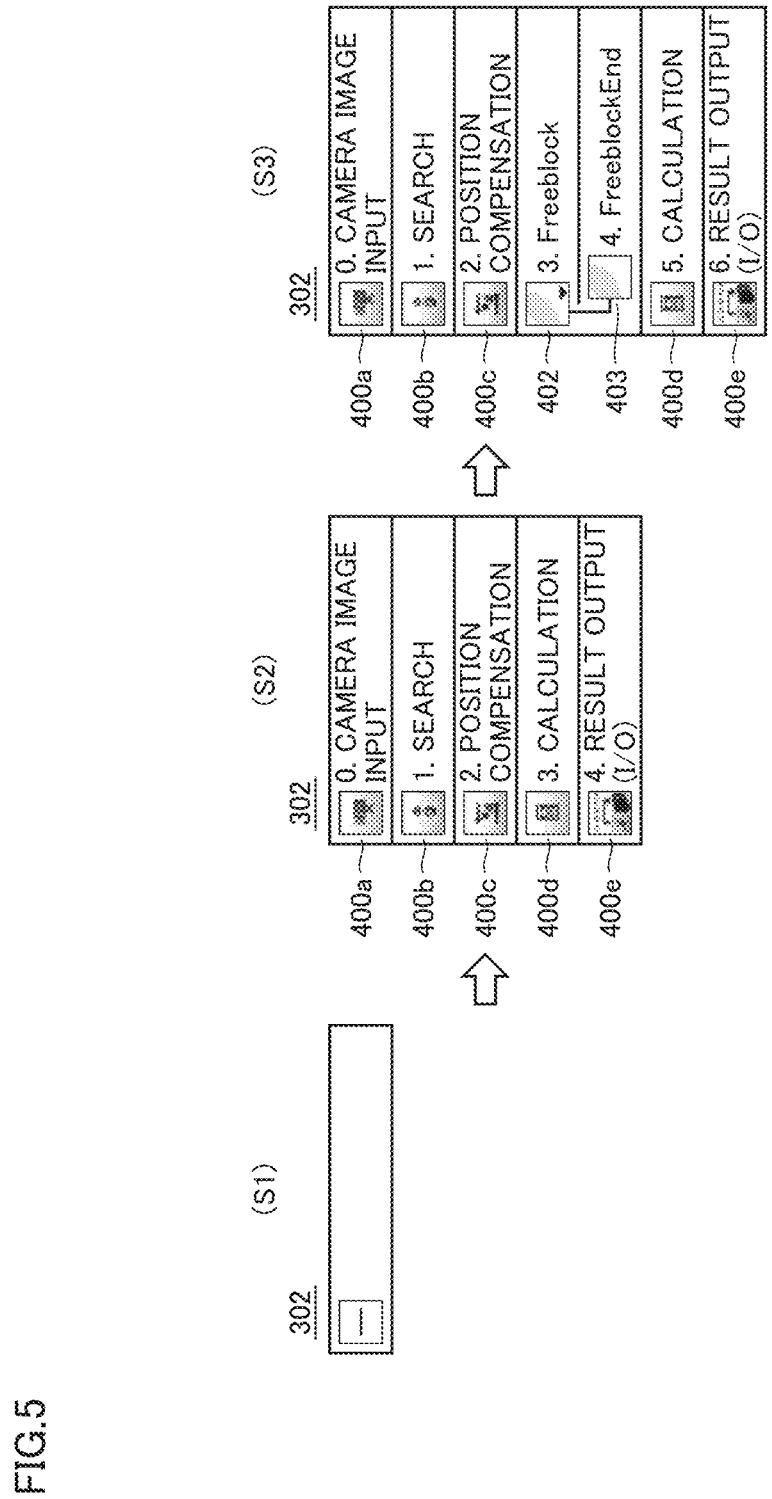
FIG. 5 is a view illustrating an example of a method for producing template data 10 of the embodiment.

FIG. 5 is a view illustrating an example of the method for producing the template data 10 of the embodiment. As illustrated in step S1, in the initial state, the object is not disposed in the work region 302 of the user interface 300. Alternatively, in the initial state, the object 400 corresponding to the normally-used processing item "camera image input" may be disposed. In this state, when the user selects the object 400 displayed on the object selection region 304 (see FIG. 4), at least one object 400 is added to the work region 302 as illustrated in step S2. The user selects the object 400 corresponding to the processing item constituting the common flow 11. The user disposes at least one object 400 such that the disposition order of the selected at least one object 400 is matched with the execution order of at least one processing item corresponding to the at least one object 400. In the work region 302 of FIG. 5, the objects 400a to 400e are disposed in this order along the vertical direction. Hereinafter, when the objects 400a to 400e are not particularly distinguished, each of the objects 400a to 400e is simply referred to as the "object 400".

Furthermore, when the user selects the object 402 displayed on the object selection region 304, at least one object 402 is added to the work region 302 as illustrated in step S3. The user disposes the object 402 at a position where insertion of new processing item is permitted. In the work region 302 of FIG. 5, the object 402 is disposed between the object 400c and the object 400d. When the object 402 is disposed, an object 403 is automatically disposed immediately below the object 402.

The plurality of previously-prepared processing items include the processing item executed using at least one previously-set parameter value. For such the processing item, the user needs to previously set the at least one parameter value. For this reason, when the object 400 disposed in the work region 302 is selected, the processor 110 displays the window setting the parameter value needed to perform the execution of the processing item corresponding to the selected object 400.

FIG. 6 is a view illustrating an example of the window setting the parameter value. The type of the parameter is previously determined according to the processing item. FIG. 6 illustrates a window 500 corresponding to the object 400a disposed in the work region 302 of FIG. 5. The window 500 exemplified in FIG. 6 includes an input field 502 setting the values of the parameters "ShutterSpeed", "Gain" and an input field 504 setting propriety of the value change. The user inputs the parameter value in the input field 502, and inputs the change propriety in the input field 504.

The processor 110 produces the template data 10 according to the objects 400, 402, 403 disposed in the work region 302 and the disposition order thereof and the input to the window 500 corresponding to each object 400 disposed in the work region 302. As described with reference to FIG. 2, the template data 10 indicates at least one designated processing item 12 and the execution order of the at least one designated processing item 12. Furthermore, the template data 10 indicates the insertion position 13 at which the insertion of a new processing item is permitted in the common flow 11 in which the at least one designated processing item 12 is arranged according to the execution order. In addition, the template data 10 indicates the parameter value needed for the execution of the designated processing item 12 and the change propriety of the parameter value.

The processor 110 sets the processing item corresponding to each object 400 disposed in the work region 302 as the designated processing item 12. The processor 110 sets the execution order of at least one designated processing item 12 based on the disposition order of at least one object 400 disposed in the work region 302. Furthermore, the processor 110 sets the insertion position 13 based on the disposition order of the objects 402 disposed in the work region 302.

FIG. 7 is a view illustrating an example of the template data 10 of the embodiment. FIG. 7 illustrates the template data 10 produced based on the objects 400a to 400e and 402, 403 disposed in the work region 302 of FIG. 5. The template data 10 in FIG. 7 has a table format. However, the template data 10 is not limited to the table format.

As illustrated in FIG. 7, the template data 10 includes a record 14 corresponding to each of the objects 400, 402, 403 disposed in the work region 302. Hereinafter, the record 14 corresponding to the object 400 is referred to as "record 14_0", the record 14 corresponding to the object 402 is referred to as "record 14_2", and the record 14 corresponding to the object 403 is referred to as "record 14_3". The object 400 disposed in the work region 302 indicates the designated processing item 12 included in the common flow 11. For this reason, the record 14_0 indicates information about the designated processing item 12. The object 402 disposed in the work region 302 indicates a starting point of the insertion position 13 of the common flow 11. For this reason, the record 14_2 indicates information about the start point of the insertion position 13. The object 403 disposed in the work region 302 indicates an end point of the insertion position 13 of the common flow 11. For this reason, the record 14_2 indicates information about the end point of the insertion position 13.

Each record 14 includes a unit number 10a, a unit identification name 10b, a unit ID 10c, a parameter identification name 10d, a setting value 10e, and change propriety 10f.

The name of the processing item (designated processing item 12) corresponding to the object 400 is set to the unit identification name 10b of the record 14_0. An ID identifying the processing item (designated processing item 12) corresponding to the object 400 is set to the unit ID 10c of the record 14_0.

When the plurality of the same objects 400,402 are disposed in the work region 302, the processor 110 may change the unit identification name 10b according to the user input in order to distinguish the plurality of same objects.

The name of the object 402,403 is set to the unit identification name 10b of the records 14_2, 14_3. IDs corresponding to the object 402, 403 are set to the unit IDs 10c of the records 14_2, 14_3.

When the plurality of the same objects 400, 402 are disposed in the work region 302, the processor 110 assigns a branch number to the ID corresponding to the object and sets the ID to which the branch number is assigned to the unit ID 10c in order to distinguish the plurality of the same objects. Alternatively, in order to distinguish the plurality of the same objects, the processor 110 may assign different IDs to the plurality of objects.

The disposition order of the objects 400, 402, 403 in the work region 302 is set to the unit number 10a of each record 14. The unit number 10a of the record 14_0 indicates the execution order of the designated processing item indicated by the corresponding unit identification name 10b. The unit number 10a of record 14_2 indicates the start point of the insertion position 13 (see FIG. 2) where the insertion of a new processing item is permitted. The unit number 10a in the record 14_3 indicates the end point of the insertion position 13 (see FIG. 2).

The name of the parameter needed for the execution of the processing item (designated processing item 12) corresponding to the object 400 is set to the parameter identification name 10d of the record 14_0. When the plurality of parameters needed for the execution of the processing item exist, the names of the plurality of parameters are set to the parameter identification name 10d.

A value (hereinafter, referred to as a "default value") input in the input field 502 of the window 500 (see FIG. 6) corresponding to the object 400 is set to the setting value 10e of the record 14_0. The propriety of being input in the input field 504 of the window 500 (see FIG. 6) corresponding to the object is set to the change propriety 10f of the record 14_0.

The parameter identification name 10d, the setting value 10e, and the change propriety 10f of the records 14_2, 14_3 are blank.

The processor 110 stores the produced template data 10 in the hard disk 120. At this point, the processor 110 prohibits overwriting of the template data 10. Thus, the template data 10 cannot be edited.

<D. Additional Data Producing Method>

A method for producing the additional data 20 will be described below. For example, the additional data 20 is produced according to the input of the vendor, the production line manager, the production line worker, or the like when or after the image processing device 100 is brought into the production line.

Figure 8:
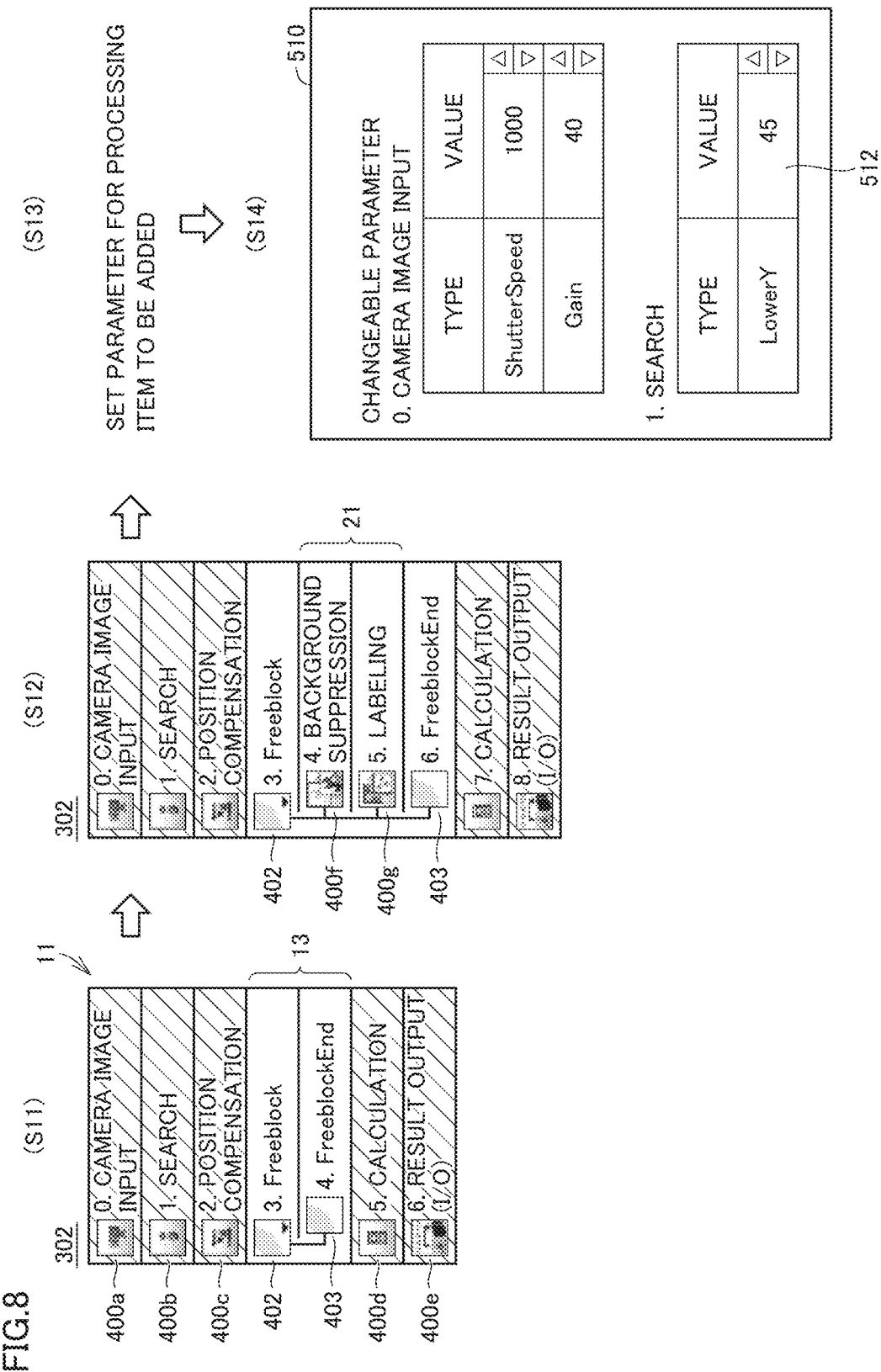
FIG. 8 is a view illustrating an example of a user interface at the time of producing additional data 20 of the embodiment.

FIG. 8 is a view illustrating an example of the user interface at the time of producing the additional data 20 of the embodiment. As illustrated in step S11, the processor 110 reads the designated template data 10 from the hard disk 120, and displays the common flow 11 indicated by the read template data 10 on the work region 302. In the work region 302, at least one object 400 corresponding to at least one designated processing item 12 indicated by the template data 10 is disposed according to the execution order. Furthermore, the object 402, 403 is continuously disposed at the insertion position 13 (see FIG. 2) indicated by the template data 10. In the work region 302 of FIG. 8, the objects 400a to 400e are disposed in this order, and the object 402, 403 are continuously disposed between the object 400c and the object 400d.

The template data 10 cannot be edited. In the common flow 11 indicated by the template data 10, only the insertion of the new processing item into the insertion position 13 is permitted. Consequently, the processor 110 can select only the position between the consecutive objects 402, 403 in the work region 302. In order to cause the user to recognize the selectable position, the processor 110 makes the display format of the consecutive objects 402, 403 different from the display format of other objects. The objects other than the consecutive objects 402, 403 are shaded in the work region 302 of FIG. 8. The method for changing the display format is not limited to the method in FIG. 8. For example, the objects other than the consecutive objects 402, 403 may be displayed in gray.

While the common flow 11 is displayed in the work region 302, the user selects the position between consecutive objects 402, 403, and selects the object 400 displayed in the object selection region 304 (see FIG. 4). The user selects the object 400 corresponding to the desired processing item constituting the individual flow 21. Thus, as illustrated in step S12, at least one object 400 is inserted between the objects 402 and the objects 403. In the work region 302 illustrated in FIG. 8, objects 400f, 400g are inserted between the object 402 and the object 403 in this order.

Subsequently, the parameter value needed for the execution of the processing item corresponding to the inserted object 400 is set as illustrated in step S13. The parameter value is set using the window 500 corresponding to the processing item in FIG. 6.

Subsequently, the parameter value that can be changed in at least one parameter needed for the execution of at least one designated processing item 12 indicated by the template data 10 is set. As illustrated in step S14, the processor 110 displays a window 510 setting the parameter value that can be changed. The window 510 includes an input field 512 setting the parameter value that can be changed. The user inputs the parameter value in the input field 512.

The processor 110 produces the additional data 20 according to the object 400 inserted between the object 402 and the object 403, the disposition order thereof, and the input to the window 500, 510. As described with reference to FIG. 2, the additional data 20 indicates at least one additional processing item 22 and the execution order of the at least one additional processing item 22. Furthermore, the additional data 20 indicates the parameter value needed for the execution of the at least one additional processing item 22. In addition, the additional data 20 indicates the parameter value (hereinafter, referred to as an "individual parameter") set to be changeable in at least one parameter needed for the execution of at least one designated processing item 12 constituting the common flow 11.

The processor 110 sets the processing item corresponding to each object 400 inserted between the object 402 and the object 403 in the work region 302 as the additional processing item 22. The processor 110 sets the execution order of at least one additional processing item 22 based on the disposition order of the at least one object 400 inserted between the object 402 and the object 403. Furthermore, the processor 110 sets the parameter value needed for the execution of the additional processing item 22 according to the input to the window 500. The processor 110 sets the value of the individual parameter in at least one parameter needed for the execution of at least one designated processing item 12 constituting the common flow 11 according to the input to the window 510.

FIG. 9 is a view illustrating an example of the additional data 20 of the embodiment. FIG. 9 illustrates the additional data 20 produced based on the objects 400f, 400g in the work region 302 of FIG. 8 and the input to the windows 500, 510. The additional data 20 in FIG. 9 is represented in the table format. However, the additional data 20 is not limited to the table format.

As illustrated in FIG. 9, the additional data 20 includes partial data 25 related to the common flow 11 and partial data 26 related to the individual flow 21.

The partial data 25 includes a record 24_0 corresponding to each individual parameter. The record 24_0 includes a data type 20a, a unit identification name 20c, a unit ID 20d, a parameter identification name 20e, and a setting value 20f. The name and ID of the designated processing item executed using the individual parameter are set to the unit identification name 20c and the unit ID 20d of the record 24_0. The name of the individual parameter is set to the parameter identification name 20e of the record 24_0. The value input in the input field 512 of the window 510 (see FIG. 8) is set to the setting value 20f of the record 24_0.

The partial data 26 includes a record 24_1 and at least one record 24_2. The record 24_1 corresponds to the object 402 indicating the start point of the insertion position 13 into which the object 400 is inserted in step S12 (see FIG. 8). The at least one record 24_2 corresponds to at least one object 400 inserted in step S12.

The record 24_1 includes the data type 20a indicating "add", the unit identification name 20c, and the unit ID 20d. The name and ID of the object 402 indicating the start point of the insertion position 13 are set to the unit identification name 20c and the unit ID 20d of the record 24_1.

The record 24_2 includes a unit number 20b, the unit identification name 20c, the unit ID 20d, the parameter identification name 20e, the setting value 20f, and a change propriety 20g.

The name and ID of the processing item (additional processing item 22) corresponding to the object 400 are set to the unit identification name 20c and the unit ID 20d of the record 24_2. The disposition order of the objects 400 between the object 402 and the object 403 is set to the unit number 20b of the record 24_2. The unit number 24b of the record 20_2 indicates the execution order of the additional processing item 22 identified by the corresponding unit identification name 20c and unit ID 20d.

The name of the parameter needed for the execution of the processing item (additional processing item 22) corresponding to the object 400 is set to the parameter identification name 20e of the record 24_2. The value input in the input field 502 of the window 500 (see FIG. 6) corresponding to the object 400 is set to the setting value 20f of the record 24_2. The propriety of being input in the input field 504 of the window 500 corresponding to the object 400 is set to the change propriety 20g of the record 24_2.

<E. Execution of Image Processing Program Based on Template Data and Additional Data>

A method for executing the image processing program 30 based on the template data 10 and the additional data 20 will be described below.

The processor 110 reads the template data 10 and the additional data 20 from the hard disk 120. The processor 110 executes the image processing program 30 in which the common flow 11 indicated by the template data 10 and the individual flow 21 indicated by the additional data 20 are combined based on the read template data 10 and additional data 20. Specifically, the processor 110 executes the image processing program 30 in which the individual flow 21 is inserted into the insertion position 13 of the common flow 11. As described above, the common flow 11 is a flow in which at least one designated processing item 12 indicated by the template data 10 is disposed according to the execution order indicated by the template data 10. The insertion position 13 in the common flow 11 is indicated by the template data 10. As described above, the individual flow 21 is a flow in which at least one additional processing item 22 indicated by the additional data 20 is disposed according to the execution order indicated by the additional data 20.

Figure 10:
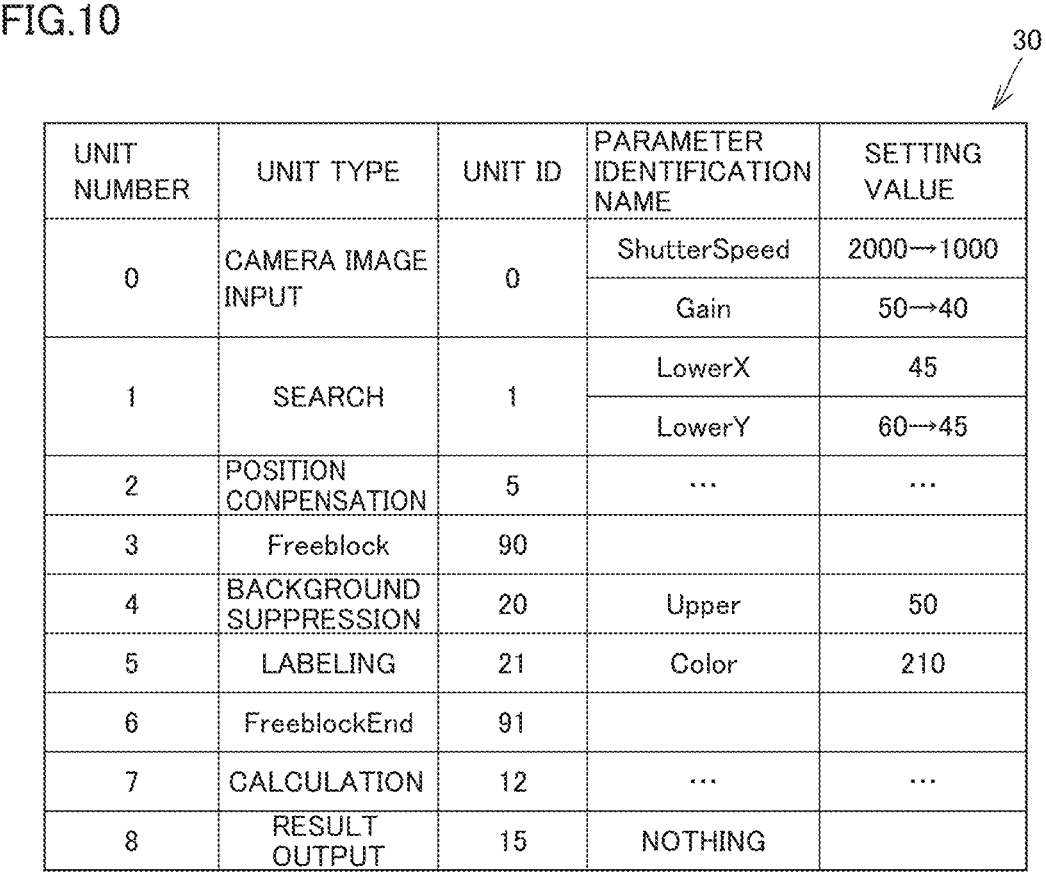
FIG. 10 is a view illustrating an example of an image processing program executed based on template data and additional data.

FIG. 10 is a view illustrating an example of the image processing program executed based on the template data and the additional data. FIG. 10 illustrates the image processing program 30 executed based on the template data 10 in FIG. 7 and the additional data 20 in FIG. 9.

The processor 110 specifies the record 14_2 having the unit identification name 10b and the unit ID 10c, which are matched with the unit identification name 20c and the unit ID 20d of the record 24_1 included in the partial data 26 of the additional data 20, from the template data 10. The processor 110 adds the record 24_2 included in the partial data 26 of the additional data 20 between the specified record 14_2 and the record 14_3 immediately below the record 14_2 in the template data 10 according to the order of the unit number 20b.

Furthermore, the processor 110 specifies the parameter identification name 10d and the setting value 10e corresponding to the change propriety 10f indicating "changeable" in the template data 10. The processor 110 extracts the record 24_0 including the same parameter identification name 20e as the specified parameter identification name 10d from the partial data 25 of the additional data 20. The processor 110 changes the setting value 10e (default value) specified in the template data 10 to the setting value 20f of the record 24_0 extracted from the additional data 20. In this manner, the processor 110 uses the value indicated by the additional data 20 for the individual parameter instead of the default value indicated by the template data 10.

In this manner, the processor 110 produces the image processing program 30 in FIG. 10 and executes the produced image processing program 30.

<F. Functional Configuration of Image Processing Device>

Figure 11:
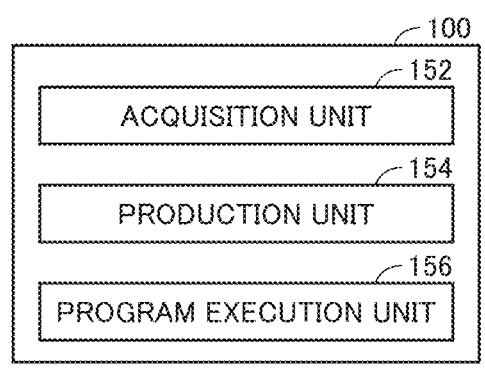
FIG. 11 is a schematic diagram illustrating a functional configuration of the image processing device of the embodiment.

A specific example of the image processing device of the embodiment will be described below. FIG. 11 is a schematic diagram illustrating a functional configuration of the image processing device of the embodiment. As illustrated in FIG. 11, the image processing device 100 includes an acquisition unit 152, a production unit 154, and a program executing unit 156. The acquisition unit 152, the production unit 154, and the program executing unit 156 are implemented by the processor 110 executing the control program 150.

The acquisition unit 152 acquires the template data 10. The acquisition unit 152 may acquire the template data 10 from an external device. Alternatively, the acquisition unit 152 may produce the template data 10 according to the above <C. Template data producing method>.

The production unit 154 produces the additional data 20 indicating at least one additional processing item 22 and the execution order of the at least one additional processing item 22. The production unit 154 produces the additional data 20 according to the <D. Additional data producing method>.

Based on the template data 10 and the additional data 20, the program executing unit 156 executes the image processing program 30 in which the individual flow 21 indicated by the additional data 20 is inserted at the insertion position 13 in the common flow 11 indicated by the template data 10. The program executing unit 156 executes the image processing program 30 according to the above <E. Execution of image processing program based on template data and additional data>.

<G. FlowChart>

Figure 12:
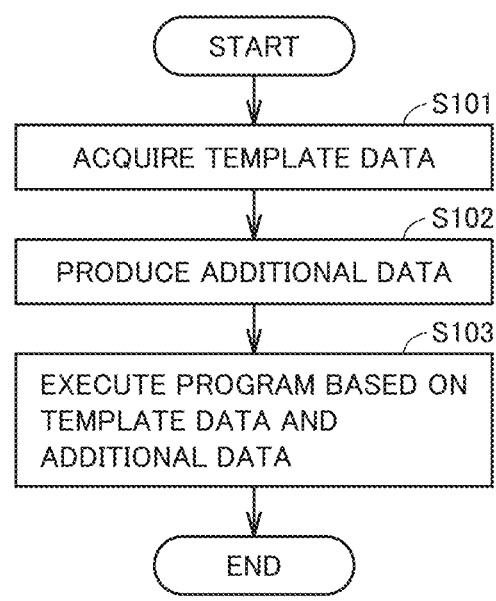
FIG. 12 is a flowchart illustrating a flow of processing for executing the image processing program in the image processing device.

FIG. 12 is a flowchart illustrating a flow of processing for executing the image processing program in the image processing device. For example, the processor 110 (see FIG. 2) of the image processing device 100 executes the control program 150, thereby implementing the processing in FIG. 12. In another aspect, a part or all of the processing may be performed by another piece of hardware.

In step S101, the processor 110 acquires the template data 10. The template data 10 indicates at least one designated processing item 12, the execution order of at least one designated processing item 12, and the insertion position 13 at which the insertion of the new processing item is permitted in the common flow 11 in which at least one designated processing item 12 is arranged according to the execution order.

In step S102, the processor 110 produces the additional data 20 indicating the at least one additional processing item 22 and the execution order of the at least one additional processing item 22.

In step S103, the processor 110 executes the image processing program 30 in which the individual flow 21 in which at least one additional processing item 22 is arranged according to the execution order is inserted into the insertion position 13 in the common flow 11 based on the template data 10 and the additional data 20.

<H. Action and Effect>

As described above, the image processing device 100 of the embodiment includes the acquisition unit 152 that acquires the template data 10. The template data 10 indicates at least one designated processing item 12, the execution order of at least one designated processing item 12, and the insertion position 13 at which the insertion of the new processing item is permitted in the common flow 11 in which at least one designated processing item 12 is arranged according to the execution order. The image processing device 100 further includes the production unit 154 and program executing unit 156. The production unit 154 produces the additional data 20 indicating at least one additional processing item 22 and the execution order of at least one additional processing item 22. The program executing unit 156 executes the image processing program 30 in which the individual flow 21 in which at least one additional processing item 22 is arranged according to the execution order is inserted into the insertion position 13 in the common flow 11 based on the template data 10 and the additional data 20.

According to the above configuration, the template data 10 indicates the insertion position 13 in the common flow 11. Then, the individual flow 21 is inserted into the insertion position 13. For this reason, the individual flow 21 can be prevented from being erroneously inserted into the position other than the insertion position 13. That is, the common flow 11 other than the insertion position 13 is not edited, but is executed as it is. Thus, the desired image processing program can be easily executed using the common flow 11 and the individual flow 21.

The template data 10 further indicates the default value and the change propriety from the default value for each of the at least one parameter needed for the execution of at least one designated processing item 12. The additional data further indicates the changed value of the individual parameter that can be changed from the default value in at least one parameter. The program executing unit 156 uses the value indicated by the additional data 20 for the individual parameter.

According to the above configuration, when not desire the change from the default value, the user produces the template data 10 that prohibits the change from the default value, so that the user can always execute the designated processing item 12 using the default value. In addition, the individual parameter that can be changed from the default value can be appropriately changed to the value suitable for the type.

The acquisition unit 152 provides the user interface 300 that receives the designation of the selection of at least one designated processing item 12 from the plurality of previously-prepared processing items, the execution order of at least one designated processing item 12, and the insertion position 13. The acquisition unit 152 produces the template data 10 according to the input to the user interface 300.

According to the above configuration, the user can easily produce the template data 10 in order to define the desired common flow 11 by operating the user interface 300.

I. Modifications

First Modification

In the above description, the template data 10 indicates one insertion position 13 in the common flow 11. However, the template data 10 may indicate a plurality of insertion positions in the common flow 11.

FIG. 13 is a view illustrating an example of the template data 10 according to first modification. The template data 10 in FIG. 13 includes three records 14_2 and three records 14_3 that are consecutive to the three records 14_2. The unit identification name 10b and the unit ID 10c included in the three records 14_2 are different from each other.

Each set of consecutive records 14_2, 14_3 indicates an insertion position where the insertion of the new processing item is permitted. A set of record 14_2 in a second row and record 14_3 in a third row indicates an insertion position 13a. A set of record 14_2 in a fourth row and record 14_3 in a fifth row indicates an insertion position 13b. A set of record 14_2 in a seventh row and record 14_3 in an eighth row indicates an insertion position 13c.

The processor 110 produces the additional data 20 indicating the three individual flows inserted into the three insertion positions 13a to 13c in the common flow.

Figure 14:
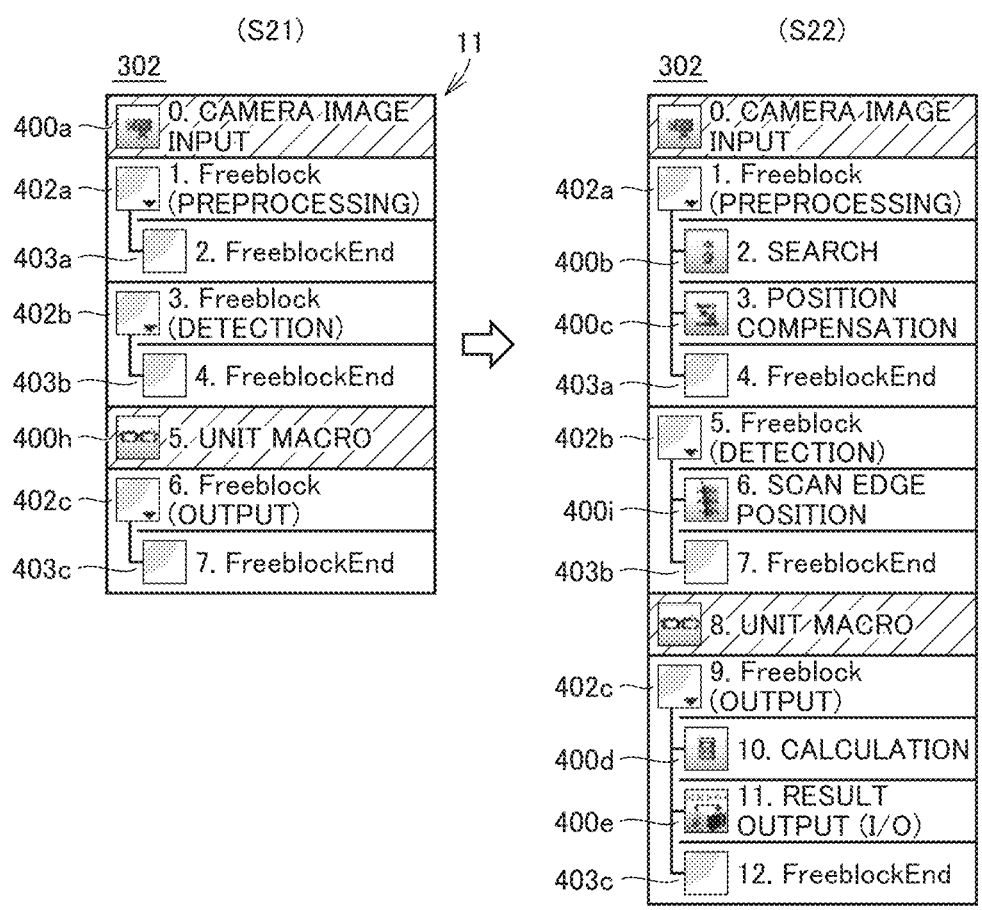
FIG. 14 is a view illustrating a method for producing the additional data 20 of the first modification.

FIG. 14 is a view illustrating the additional data producing method of first modification. As illustrated in step S21, the processor 110 reads the designated template data 10 from the hard disk 120, and displays the common flow 11 indicated by the read template data 10 on the work region 302.

The common flow 11 corresponding to the template data 10 in FIG. 13 is displayed in the work region 302 of FIG. 14. That is, the objects 400a, 400h corresponding to the processing items of the unit identification name 10b of the record 14_0 in the first row and the sixth row of the template data 10 in FIG. 13 are disposed in this order.

Furthermore, the objects 402a, 403a corresponding to the unit identification names 10b of the record 14_2 in the second row and the record 14_3 in the third row of the template data 10 are disposed immediately below the object 400a in this order. The objects 402b, 403b corresponding to the unit identification names 10b of the record 14_2 in the fourth row and the record 14_3 in the fifth row of the template data 10 are disposed immediately below the object 403a in this order. The objects 402c, 403c corresponding to the unit identification names 10b of the record 14_2 in the seventh row and the record 14_3 in the eighth row of the template data 10 are disposed immediately below the object 400h in this order. Hereinafter, when the objects 402a to 402c are not particularly distinguished from each other, each of the objects 402a to 402c is simply referred to as the "object 402". Furthermore, when the objects 403a to 403c are not particularly distinguished, each of the objects 403a to 403c is simply referred to as the "object 403".

In the work region 302, the processor 110 can select only the position between the consecutive objects 402a, 403a, the position between the consecutive objects 402b, 403b, and the position between the consecutive objects 402c, 403c as the insertion position of the new processing item. The processor 110 hatches the object other than the set of consecutive objects 402, 403 in order to cause the user to recognize that the position other than between the consecutive objects 402, 403 cannot be selected.

While the common flow 11 is displayed in the work region 302, the user selects the position between consecutive objects 402, 403, and selects the object 400 displayed in the object selection region 304 (see FIG. 4). Thus, as illustrated in step S22, at least one object 400 is inserted between the objects 402, 403.

The user inserts the object 400 corresponding to at least one processing item constituting the individual flow to be inserted into the insertion position 13a between the consecutive objects 402a, 403a. The user inserts the object 400 corresponding to at least one processing item constituting the individual flow to be inserted into the insertion position 13b between the consecutive objects 402b, 403b. The user inserts the object 400 corresponding to at least one processing item constituting the individual flow to be inserted into the insertion position 13c between the consecutive objects 402c, 403c.

As illustrated in step S22, in the work region 302 of FIG. 14, the objects 400b, 400c are inserted between the object 402a and the object 403a in this order. An object 400i is inserted between the object 402b and the object 403b. The objects 400d and 400e are inserted in this order between the consecutive objects 402c and object 403c.

Then, similarly to step S13 in FIG. 6, the parameter value needed for the execution of the processing item corresponding to the added object 400 is set. Further, similarly to step S14 in FIG. 8, the processor 110 displays the window 510 setting the parameter value that can be changed, and receives the input of the parameter value to the input field 512.

The processor 110 produces the additional data 20 according to the object 400 inserted between the object 402, 403 and the disposition order thereof and the input to the windows 500, 510.

FIG. 15 is a view illustrating an example of the additional data 20 of first modification. FIG. 15 illustrates the additional data 20 produced based on the work region 302 in FIG. 14.

As illustrated in FIG. 15, the additional data 20 includes the partial data 25 related to the common flow 11 and three pieces of partial data 26a to 26c respectively corresponding to the three individual flows.

Similarly to the partial data 26 in FIG. 9, each of the partial data 26a to 26c includes the record 24_1 corresponding to the object 402 indicating the start point of the insertion position and at least one record 24_2 corresponding to at least one inserted object 400.

The partial data 26a is data corresponding to the individual flow inserted into the insertion position 13a. For this reason, the unit identification name 20c and the unit ID 20d that identify the object 402a are set to the record 24_1 of the partial data 26a. Thus, the individual flow specified by the record 24_2 of the partial data 26a is recognized as a flow inserted into the insertion position 13a indicated by the template data 10. Accordingly, the information specifying the processing items corresponding to the objects 400b, 400c inserted between the object 402a and the object 403a is set to the two records 24_1 of the partial data 26a.

The partial data 26b is data corresponding to the individual flow inserted into the insertion position 13b. For this reason, the unit identification name 20c and the unit ID 20d that identify the object 402b are set to the record 24_1 of the partial data 26b. Thus, the individual flow specified by the record 24_2 of the partial data 26b is recognized as a flow inserted into the insertion position 13b indicated by the template data 10. Accordingly, the information specifying the processing items corresponding to the object 400i inserted between the object 402b and the object 403b is set to the record 24_2 of the partial data 26b.

The partial data 26c is data corresponding to the individual flow inserted into the insertion position 13c. For this reason, the unit identification name 20c and the unit ID 20d that identify the object 402c are set to the record 24_1 of the partial data 26c. Thus, the individual flow specified by the record 24_2 of the partial data 26c is recognized as a flow inserted into the insertion position 13c indicated by the template data 10. Accordingly, the information specifying the processing items corresponding to the objects 400d, 400e inserted between the object 402c and the object 403c is set to the two records 24_2 of the partial data 26c.

The processor 110 specifies the insertion position in the common flow 11 by checking the record 24_1 of each of the three pieces of partial data 26a to 26c included in the additional data 20 based on the template data 10 and the additional data 20. The processor 110 can produce the image processing program 30 by inserting the individual flow indicated by the record 24_2 of the partial data 26 corresponding to the specified insertion position.

(Second Modification)

The template data 10 may constitute another template data 40 and additional data 50 for the template data 40.

The template data 40 is previously produced by, for example, a method similar to the above <C. Template data producing method>. The template data 40 defines a partial flow (hereinafter, referred to as a "first partial flow 41") of the desired common flow 11.

Figure 16:
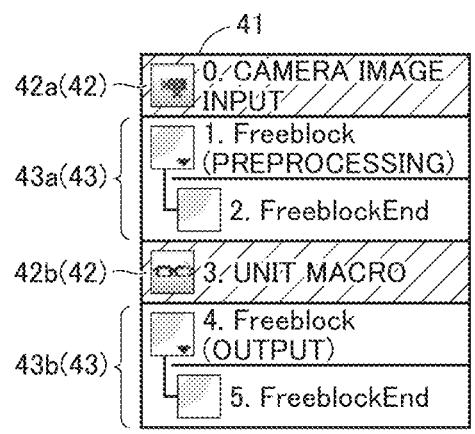
FIG. 16 is a view illustrating an example of a first partial flow 41 defined by template data 40 according to a second modification.

FIG. 16 is a view illustrating an example of the first partial flow 41 defined by the template data 40 according to a second modification. The template data 40 indicates at least one designated processing item 42 included in the first partial flow 41 and the execution order of the at least one designated processing item 42. Furthermore, the template data 40 indicates a plurality of insertion positions 43 at which the insertion of the new processing item is permitted in the first partial flow 41. The template data 40 in FIG. 16 indicates two insertion positions 43a, 43b at which the insertion of the new processing item is permitted in the first partial flow 41 in which the designated processing items 42a, 42b are disposed in this order. The insertion position 43a is a position between the designated processing items 42a, 42b. The insertion position 43b is a position immediately after the designated processing item 42b.

Figure 17:
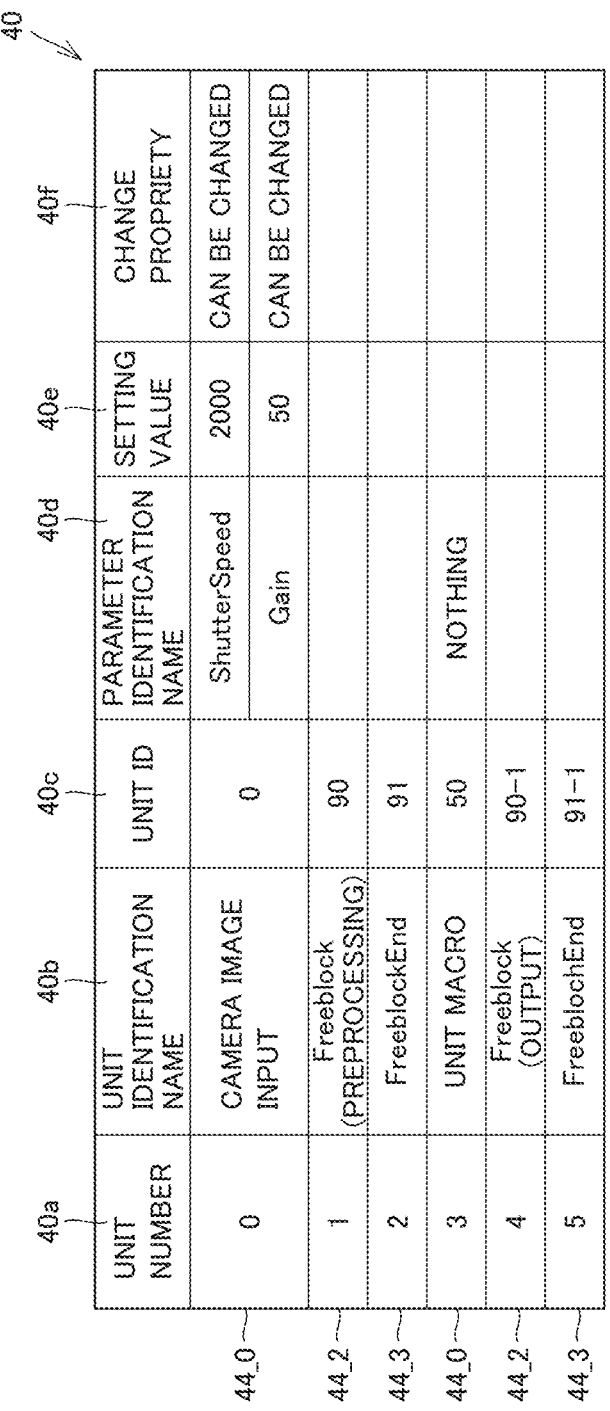
FIG. 17 is a view illustrating an example of the template data 40 of the second modification.

FIG. 17 is a view illustrating an example of the template data 40 of the second modification. FIG. 17 illustrates the template data 40 defining the first partial flow 41 in FIG. 16. The format of the template data 40 is the same as the format of the template data 10. That is, the template data 40 includes two records 44_0 indicating the information about the designated processing items 42a, 42b, two records 44_2 indicating the information about the start points of the insertion positions 43a, 43b, and two records 44_3 indicating the information about the end points of the insertion positions 43a, 43b.

Figure 18:
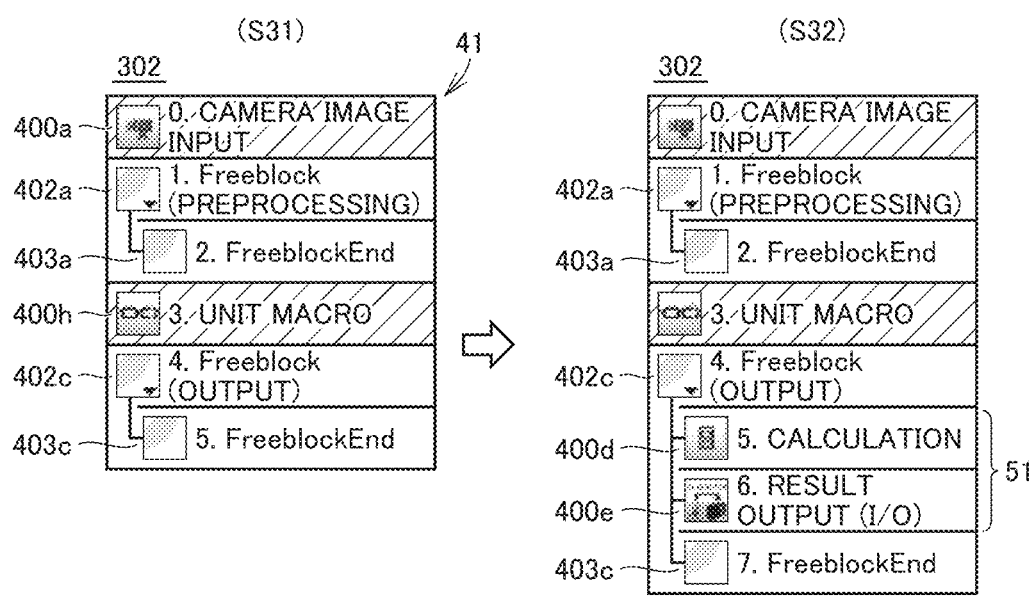
FIG. 18 is a view illustrating an example of the user interface at the time of producing additional data 50 of the second modification.

FIG. 18 is a view illustrating an example of the user interface at the time of producing the additional data 50 of the second modification. As illustrated in step S31, the processor 110 reads the designated template data 40 from the hard disk 120, and displays the first partial flow 41 indicated by the read template data 40 on the work region 302. The first partial flow 41 in FIG. 16 is displayed in the work region 302 in FIG. 18. That is, the objects 400a, 400h corresponding to the designated processing items 42a, 42b are disposed in this order. The objects 402a, 403a corresponding to the start point and the end point of the insertion position 43a are successively disposed between the objects 400a, 400h. Furthermore, the objects 402c, 403c corresponding to the start point and the end point of the insertion position 43b are successively disposed immediately below the object 400h.

While the first partial flow 41 is displayed in the work region 302, the user selects one of the insertion positions 43a, 43b in the first partial flow 41 and selects the object 400, 402 displayed in the object selection region 304 (see FIG. 4).

In the example of FIG. 18, the user selects the position between the objects 402c, 403c, and selects the objects 400d, 400e corresponding to the processing items constituting a second partial flow 51 inserted into the insertion position 43b of the first partial flow 41. Thus, as illustrated in step S32, the objects 400d, 400e are inserted between the objects 402c, 403c in this order.

The processor 110 produces the additional data 50 according to the object added to the work region 302 and the disposition order thereof.

FIG. 19 is a view illustrating an example of the additional data 50 of the second modification. FIG. 19 illustrates the additional data 50 produced according to the disposition of the object in the work region 302 of FIG. 18. The format of the additional data 50 is the same as the format of the additional data 20. That is, the additional data 50 includes the partial data 55 related to the first partial flow 41 and the partial data 56 related to the second partial flow 51. The partial data 55 includes a record 54_0 corresponding to each parameter (individual parameter) that can be changed in at least one parameter needed for the execution of the designated processing item 42 constituting the first partial flow 41. The partial data 56 includes a record 54_1 specifying the insertion position 43b at which the second partial flow 51 is inserted, and at least one records 54_2 specifying at least one designated processing item 52 constituting the second partial flow 51. A unit number 50b of each of the at least one record 54_2 indicates the execution order of a corresponding unit identification name 50c.

In this manner, the processor 110 sets designated processing items 52a, 52b constituting the second partial flow 51 inserted into the insertion position 43b based on the two processing items corresponding to the objects 400d, 400e disposed in the work region 302. The processor 110 further sets the execution order of the designated processing items 52a, 52b based on the order of the objects 400d, 400e disposed in the work region 302. Then, the processor 110 produces the additional data 50 indicating the designated processing items 52a, 52b and their execution order.

Figure 20:
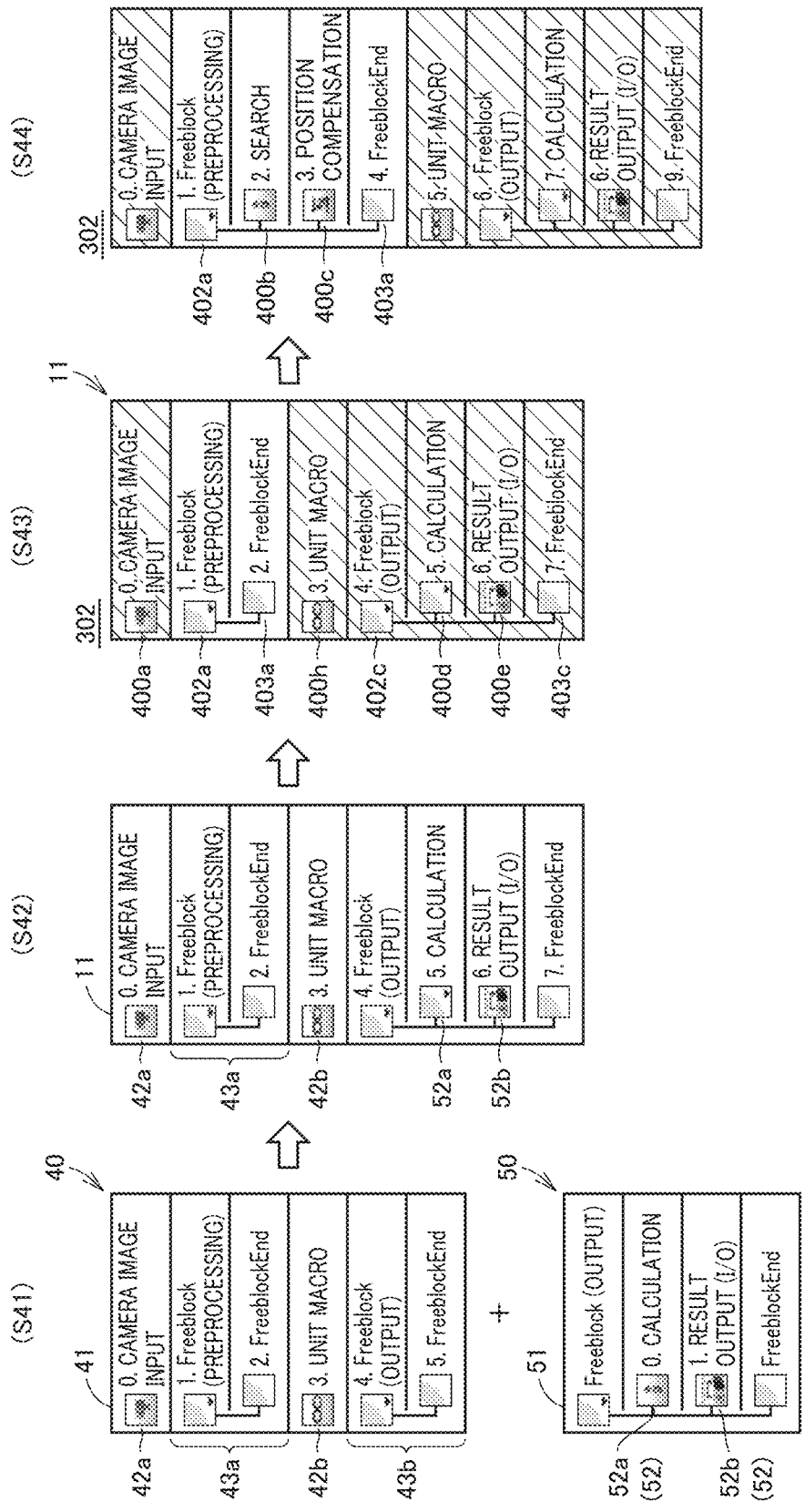
FIG. 20 is a view illustrating a flow of a method for producing the additional data 20 of the second modification.

With reference to FIGS. 20 and 22, a method for producing the additional data 20 of the second modification will be described. FIG. 20 is a view illustrating a flow of the method for producing the additional data 20 of the second modification. FIG. 22 is a view illustrating an example of the additional data 20 for the template data 10.

As illustrated in step S41 of FIG. 20, the processor 110 reads the template data 40 and the additional data 50 that constitute the template data 10 from the hard disk 120.

Hereinafter, it is assumed that the processor 110 has read the template data 40 in FIG. 17 and the additional data 50 in FIG. 19. That is, the template data 40 defines the first partial flow 41 in which the designated processing items 42a, 42b are disposed in this order. Furthermore, the template data 40 indicates the insertion position 43a between the designated processing items 42a, 42b and the insertion position 43b after the designated processing item 42b. The additional data 50 defines the second partial flow 51 inserted into the insertion position 43b selected from the insertion positions 43a, 43b. The additional data 50 indicates at least one designated processing item 52 constituting the second partial flow 51 and the execution order of the at least one designated processing item 52. The second partial flow 51 in FIG. 20 is a flow in which the designated processing items 52a, 52b are disposed in this order.

Subsequently, as described in step S42, the processor 110 produces the common flow 11 combining the first partial flow 41 and the second partial flow 51 based on the template data 40 and the additional data 50. The processor 110 may produce the common flow 11 combining the first partial flow 41 and the second partial flow 51 according to the method described in <E. Execution of image processing program based on template data and additional data>.

That is, the template data 10 including the template data 40 and the additional data 50 indicates the designated processing items 42a, 42b, 52a, 52b as the designated processing item constituting the common flow 11. The execution order of the designated processing items 42a, 42b, 52a, 52b is set according to the common flow 11 in which the second partial flow 51 in which the designated processing items 52a, 52b are arranged according to the execution order is inserted into the insertion position 43b selected from the insertion positions 43a, 43b in the first partial flow 41. In the common flow 11 in which the second partial flow 51 is inserted at the insertion position 43b in the first partial flow 41, the insertion position at which the insertion of the new processing item is permitted is the unselected insertion position 43a.

Subsequently, as illustrated in step S43, the processor 110 displays the object corresponding to the processing item constituting the common flow 11 on the work region 302. The processor 110 disposes the objects corresponding to the unit identification names 40b of the records 44_0, 44_2, 44_3 included in the template data 40 according to the order of the unit numbers 40a. In the example of FIG. 20, the objects 400a, 400h corresponding to the designated processing items 42a, 42b are disposed in this order. The objects 402a, 403a corresponding to the start point and the end point of the insertion position 43a are disposed between the objects 400a, 400h. Furthermore, the objects 402c, 403c corresponding to the start point and the end point of the insertion position 43b are disposed after the object 400h.

Furthermore, the processor 110 inserts the object corresponding to the unit identification name 50c of the record 54_2 into the position specified according to the record 54_1 included in the partial data 56 of the additional data 50 according to the order of the unit number 50b. In the example of FIG. 20, the objects 400d, 400e corresponding to the designated processing items 52a, 52b are inserted between the objects 402c, 403c in this order. The additional data 50 does not indicate the processing item inserted into the insertion position 43a. For this reason, the objects 402a, 403a corresponding to the start point and the end point of the insertion position 43a remain continuous.

In the work region 302, the processor 110 can select only the position between the consecutive objects 402a, 403a as the additional position of the new processing item. The processor 110 hatches the object other than the set of the consecutive objects 402a, 403a in order to cause the user to recognize that the position other than the position between the consecutive objects 402a, 403a cannot be selected.

While the common flow 11 is displayed in the work region 302, the user selects the position between the consecutive objects 402a, 403a, and selects the object 400 displayed in the object selection region 304 (see FIG. 4). Thus, as illustrated in step S44, at least one object 400 is inserted between the objects 402a, 403a. In the example of FIG. 20, the objects 400b, 400c are inserted in this order.

The processor 110 produces the additional data 20 according to the objects 400b, 400c inserted between the objects 402a, 403a and the disposition order thereof. The additional data 20 is produced according to the above <D. Additional data producing method>. FIG. 22 illustrates the additional data 20 produced according to the work region 302 in FIG. 20. The partial data 26 of the additional data 20 includes the record 24_1 indicating the information about the start point of the insertion position 43a and two records 24_2 indicating the information corresponding to the objects 400b, 400c added to the insertion position 43a.

The processor 110 may produce the image processing program based on the template data 10 (the template data 40 and the additional data 50) and the additional data 20 according to the method described in <E. Execution of image processing program based on template data and additional data>.

In the above example, the template data 40 indicates the two insertion positions 43, and the additional data 50 indicates the second partial flow 51 inserted into one insertion position 43 selected from the two insertion positions 43. However, the template data 40 may indicate N insertion positions 43, and the additional data 50 may indicate the second partial flow 51 inserted into the insertion position for each of M insertion positions 43 selected from the N insertion positions 43. N is an integer greater than or equal to 2, and M is a positive integer less than N. In this case, the template data 10 indicates the unselected insertion position 43 in the N insertion positions 43 when the second partial flow 51 is inserted into each of the M insertion positions 43 in the first partial flow 41 as the insertion position 13.

According to the second modification, when the template data 40 is already produced, the template data 10 can be easily produced by producing the additional data 50. In addition, production work of the image processing program can be shared by a plurality of users. As described above, the user of the image processing device 100 include the SE, the SIer, the vendor, the production line manager, the production line worker, and the like. For example, the SE may produce the template data 40, the vendor may produce the additional data 50, and the production line manager may produce the additional data 20.

In the above description, when the common flow 11 defined by the template data 10 configured of the template data 40 and the additional data 50 is displayed in the work region 302, the processor 110 sets the position between the consecutive objects 402, 403 to the insertion position 13 where the insertion of the new processing item is permitted. However, the additional data 50 may indicate the insertion position 43 at which the insertion of the new processing item is prohibited in the plurality of insertion positions 43 indicated by the template data 40. In this case, the processor 110 excludes the position where the insertion of the new processing item is prohibited by the additional data 50 in the positions between the consecutive objects 402, 403 from the insertion position.

Figure 21:
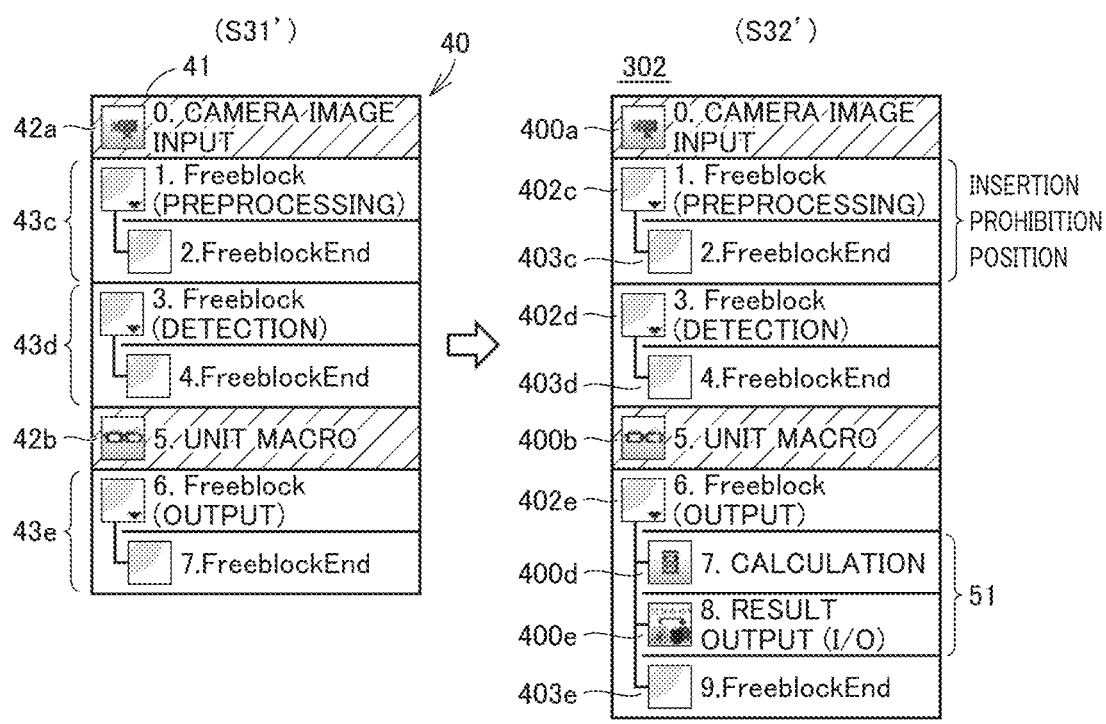
FIG. 21 is a view illustrating another example of the user interface at the time of producing the additional data 50 of the second modification.

FIG. 21 is a view illustrating another example of the user interface at the time of producing the additional data 50 of the second modification. In step S31', the processor 110 reads the template data 40. The template data 40 in FIG. 21 illustrates the first partial flow 41 in which the designated processing items 42a, 42b are executed in this order. Furthermore, the template data 40 indicates three insertion positions 43c to 43e.

In step S32', the processor 110 displays the objects 400a, 400b corresponding to the designated processing items 42a, 42b constituting the first partial flow 41 indicated by the template data 40 on the work region 302. In addition, the processor 110 also displays the objects corresponding to the start point and the end point on the work region 302 for each of the insertion positions 43c to 43e. Specifically, the objects 402c, 403c corresponding to the start point and the end point of the insertion position 43c, the objects 402d, 403d corresponding to the start point and the end point of the insertion position 43d, and the objects 402e, 403e corresponding to the start point and the end point of the insertion position 43e are displayed. The processor 110 receives the addition of the object to the work region 302. In the work region 302 of FIG. 21, the user disposes the objects 400d, 400e corresponding to the processing items constituting the second partial flow 51 between the objects 402e, 403e corresponding to the insertion position 43e. Furthermore, the user inputs that the objects 402c, 403c corresponding to the insertion position 43c are designated as the insertion prohibited positions of the new processing item. Thus, the processor 110 produces the additional data 50 defining the second partial flow 51 inserted into the insertion position 43e in the three insertion positions 43c to 43e. Furthermore, the processor 110 causes the additional data 50 to include the data indicating that the insertion of the new processing item into the insertion position 43c is prohibited. A method for designating the prohibited position for the insertion of the new processing item is not particularly limited.

In this example, in the common flow 11 defined by the template data 10 including the template data 40 and the additional data 50, the processor 110 sets the insertion position 43d other than the insertion positions 43c, 43e in the three insertion positions 43c to 43e to the insertion position 13 at which the insertion of the new processing item is permitted.

(Third Modification)

The additional data 50 may indicate the insertion position where the insertion of the new processing item is permitted in the flow inserted into the insertion position 43 of the first partial flow 41.

The additional data 50 according to a third modification is produced according to the above <D. Additional data producing method>. However, in the third modification, when the additional data 50 is produced, the object 402 is also added to the work region 302.

Figure 23:
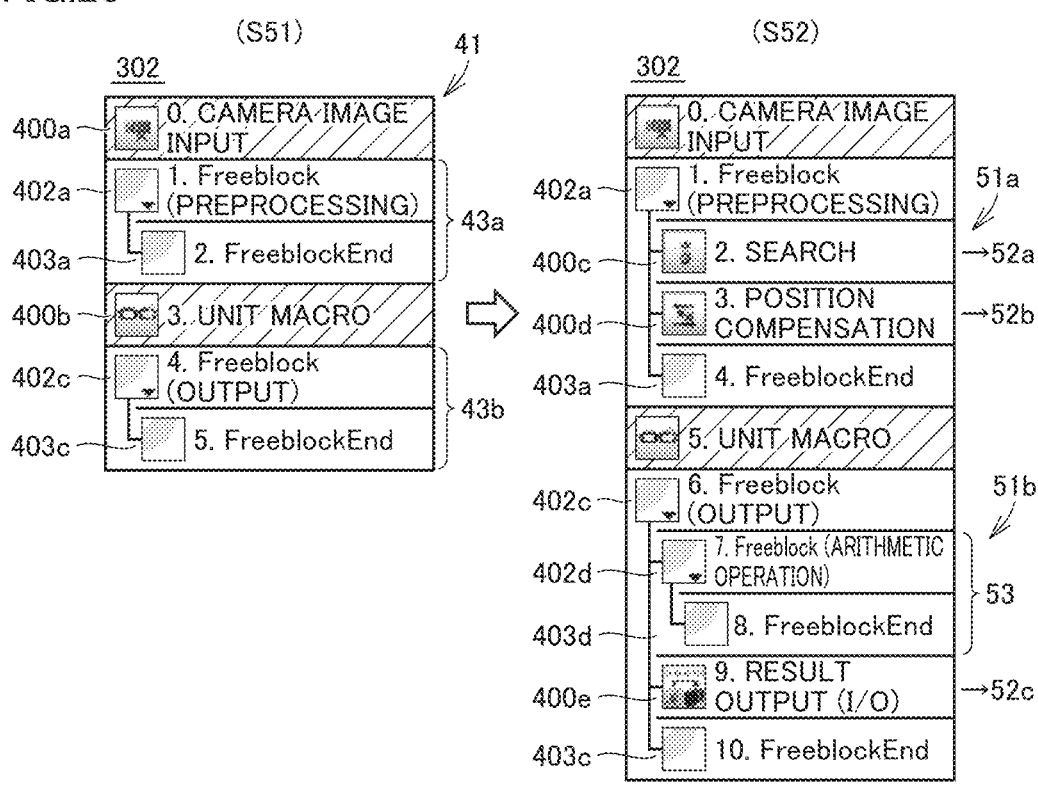
FIG. 23 is a view illustrating an example of a user interface at the time of producing additional data 50 according to a third modification.

FIG. 23 is a view illustrating an example of the user interface at the time of producing additional data 50 of the third modification. As illustrated in step S51, the processor 110 reads the designated template data 40 from the hard disk 120, and displays the first partial flow 41 indicated by the read template data 40 on the work region 302. In the work region 302 of FIG. 23, the objects 400a, 400b are disposed in this order. The objects 402a, 403a are continuously disposed between the objects 400a, 400b. The objects 402a, 403a indicate the insertion positions 43a in the first partial flow 41. Furthermore, the objects 402c, 403c are continuously disposed immediately below the object 400b. The objects 402c, 403c indicate the insertion position 43b in the first partial flow 41.

While the first partial flow 41 is displayed in the work region 302, the user selects the insertion positions 43a, 43b in the first partial flow 41 and selects the object 400, 402 displayed on the object selection region 304 (see FIG. 4).

The user selects the position between the objects 402a, 403a, and selects the object 400 corresponding to the processing item constituting a second partial flow 51a inserted into the insertion position 43a of the first partial flow 41. Thus, as illustrated in step S52, the objects 400c, 400d are inserted between the objects 402a, 403a in this order.

The user selects the position between the objects 402c, 403c, and selects the object 400 corresponding to the processing item constituting a third partial flow 51b inserted into the insertion position 43b of the first partial flow 41. Thus, as illustrated in step S52, the object 400e is inserted between the objects 402c, 403c.

Furthermore, the user disposes the object 402 at the insertion position where the insertion of the new processing item is permitted in the inserted partial flow. In the example of FIG. 23, the objects 402d, 403d are inserted between the object 402c and the object 400e. The objects 402d, 403d are disposed at the insertion position 53 in the third partial flow 51b.

The processor 110 produces the additional data 50 according to the object 400, 402, 403 added to the work region 302 and the disposition order thereof.

FIG. 24 is a view illustrating an example of the additional data 50 of the third modification. FIG. 24 illustrates the additional data 50 produced according to the dispositions of the object 400, 402, 403 in the work region 302 of FIG. 23.

The additional data 50 includes the partial data 55 related to the first partial flow 41, the partial data 56 related to the second partial flow 51a inserted into the insertion position 43a of the first partial flow 41, and the partial data 57 related to the third partial flow 51b inserted into the insertion position 43b of the first partial flow 41. The partial data 55 and the partial data 56 are as described in second modification.

Similarly to the partial data 56, the partial data 57 includes the record 54_1 specifying the insertion position 43b at which the third partial flow is inserted, and the record 54_2 specifying the designated processing item constituting the third partial flow. The information about the processing item (designated processing item) corresponding to the object 400e inserted into the insertion position 43b is set to the record 54_2 of the partial data 57.

Furthermore, the partial data 57 includes the records 54_3, 54_4 corresponding to the objects 402d, 403d inserted into the insertion position 43b. The records 54_3, 54_4 are set by the same method as the method for setting the records 15_2, 15_3 of the template data 10. The record 54_3 indicates the information about the start point of the insertion position 53 in the third partial flow 51b. The record 54_4 indicates the information about the end point of the insertion position 53.

The numbers indicating the disposition order of the objects 400e, 402d, 403d between the objects 402c, 403c are set to the unit numbers 50b of the records 54_2, 54_3, 54_4. Accordingly, the unit number 50b of the record 54_2 indicates the execution order of the object 400e in the third partial flow 51b. The unit numbers 50b of the records 54_3, 54_4 indicate the positions of the start point and the end point of the insertion position 53 in the third partial flow.

In this manner, the processor 110 sets the designated processing item 52c constituting the third partial flow 51b inserted into the insertion position 43b based on the processing item corresponding to the objects 400e disposed in the work region 302. The processor 110 further sets the insertion position 53 at which the insertion of the new processing item is permitted in the third partial flow 51b based on the objects 402c, 403c disposed in the work region 302. Then, the processor 110 produces the additional data 50 indicating the designated processing items 52a, 52b and their execution order.

With reference to FIGS. 25 and 26, a method for producing the additional data 20 of the third modification will be described. FIG. 25 is a view illustrating a flow of the method for producing the additional data 20 of the third modification. FIG. 26 is a view illustrating an example of the additional data 20 of the third modification.

As illustrated in step S61 of FIG. 25, the processor 110 reads the template data 40 and the additional data 50 that constitute the template data 10 from the hard disk 120.

Hereinafter, it is assumed that the processor 110 has read the template data 40 in FIG. 17 and the additional data 50 in FIG. 24. That is, the template data 40 defines the first partial flow 41 in which the designated processing items 42a, 42b are disposed in this order. Furthermore, the template data 40 indicates the insertion position 43a between the designated processing items 42a, 42b and the insertion position 43b after the designated processing item 42b. The additional data 50 defines the second partial flow 51a inserted into the insertion position 43a and the third partial flow 51b inserted into the insertion position 43b. The second partial flow 51a is a flow in which the designated processing items 52a, 52b are disposed in this order. The third partial flow 51b is a flow including the designated processing item 52c. Furthermore, the additional data 50 indicates the insertion position 53 before the designated processing item 52c in the third partial flow 51b.

Subsequently, as described in step S62, the processor 110 produces the common flow 11 combining the first partial flow 41, the second partial flow 51a, and the third partial flow 51b based on the template data 40 and the additional data 50. The processor 110 may produce the common flow 11 combining the first partial flow 41, the second partial flow 51a, and the third partial flow 51b according to the method described in <E. Execution of image processing program based on template data and additional data>.

That is, the template data 10 including the template data 40 and the additional data 50 indicates the designated processing items 42a, 42b, 52a, 52b, 52c as the designated processing item constituting the common flow 11. The execution order of the designated processing items 42a, 42b, 52a, 52b, 52c is set according to the common flow 11 in which the second partial flow 51a and the third partial flow 51b are inserted into the insertion positions 43a, 43b in the first partial flow 41. In the common flow 11, the insertion position where the insertion of the new processing item is permitted becomes the insertion position 53 when the third partial flow 5 1b is inserted into the insertion position 43b in the first partial flow 41.

Subsequently, as illustrated in step S63, the processor 110 displays the object corresponding to the processing item constituting the common flow 11 on the work region 302. The processor 110 disposes the objects corresponding to the unit identification names 40b of the records 44_0, 44_2, 44_3 included in the template data 40 according to the order of the unit numbers 40a. In the example of FIG. 25, the objects 400a, 400h corresponding to the designated processing items 42a, 42b are disposed in this order. The objects 402a, 403a corresponding to the start point and the end point of the insertion position 43a are disposed between the objects 400a, 400h. Furthermore, the objects 402c, 403c corresponding to the start point and the end point of the insertion position 43b are disposed after the object 400h.

Furthermore, the processor 110 inserts the object corresponding to the unit identification name 50c of the record 54_2 included in the partial data 56 into the position specified according to the record 54_1 included in the partial data 56 of the additional data 50 according to the order of the unit number 40a. In the example of FIG. 25, the objects 400b, 400c corresponding to the designated processing items 52a, 52b are inserted between the objects 402a, 403a.

Similarly, the processor 110 inserts the object corresponding to the unit identification names 50c of the records 54_2, 54_3, 54_4 included in the partial data 57 into the position specified according to the record 54_1 included in the partial data 57 of the additional data 50 according to the order of the unit number 50b. In the example of FIG. 25, the object 402d corresponding to the start point of the insertion position 53, the object 403d corresponding to the end point of the insertion position 53, and the object 400e corresponding to the designated processing item 52c are inserted between the objects 402c, 403c in this order. In this manner, the objects 402d, 403d corresponding to the start point and the end point of the insertion position 53 are continuous.

In the work region 302, the processor 110 can select only the position between the consecutive objects 402d, 403d as the additional position of the new processing item. The processor 110 hatches the object other than the set of the consecutive objects 402d, 403d in order to cause the user to recognize that the position other than the position between the consecutive objects 402d, 403d cannot be selected.

While the common flow 11 is displayed in the work region 302, the user selects the position between the consecutive objects 402d, 403d, and selects the object 400 displayed in the object selection region 304 (see FIG. 4). Thus, as illustrated in step S64, at least one object 400 is inserted between the objects 402d, 403d. In the example of FIG. 25, the object 400d is inserted.

The processor 110 produces the additional data 20 according to at least one object 400 inserted between the objects 402d, 403d and the disposition order thereof. The additional data 20 is produced according to the above <D. Additional data producing method>. FIG. 26 illustrates the additional data 20 produced according to the work region 302 in FIG. 25. The partial data 26 of the additional data 20 includes the record 24_1 indicating the information about the start point of the insertion position 53 and the records 24_2 indicating the information corresponding to the object 400d added to the insertion position 53.

The processor 110 may produce the image processing program based on the template data 40, the additional data 50, and the additional data 20 according to the method described in <E. Execution of image processing program based on template data and additional data>.

According to the third modification, when the template data 40 is already produced, the template data 10 can be easily produced by producing the additional data 50. In addition, production work of the image processing program can be shared by a plurality of users. As described above, the user of the image processing device 100 include the SE, the SIer, the vendor, the production line manager, the production line worker, and the like. For example, the SE may produce the template data 40, the vendor may produce the additional data 50, and the production line manager may produce the additional data 20.

(Fourth Modification)

The template data 10 may indicate the range of the value that can be set for the individual parameter that can be changed from the default value. For example, the processor 110 receives the input of the range of the value that can be set in the window 500 of FIG. 6. The processor 110 may produce the template data 10 indicating the input range.

When the template data 10 indicates the settable value range, the processor 110 restricts the value input to the input field 512 to the value within the range in the window 510 of FIG. 8. Thus, the additional data 20 indicates the value within the range for the individual parameter.

(Fifth Modification)

In the above description, the processor 110 produces the template data 10 including the disposition order (the unit number 10a in FIG. 7) of the object 402 disposed in the work region 302 as the information indicating the insertion position 13. That is, the insertion position 13 indicated by the template data 10 is defined by the disposition order of the objects 402. However, the insertion position 13 indicated by the template data 10 may not be defined by the disposition order of the objects 402.

For example, the processor 110 may receive the designation of two processing items 12 continuously executed in the common flow 11, and determine the position between the designated two processing items 12 as the insertion position 13. In this case, the processor 110 may produce the template data 10 including information specifying the two designated processing items 12 as the information indicating the insertion position 13.

Alternatively, the processor 110 may receive the designation of one processing item 12 constituting the common flow 11, and determine the position immediately before (or immediately after) the designated processing item 12 as the insertion position 13. In this case, the processor 110 may produce the template data 10 including the information specifying the one designated processing item 12 as the information indicating the insertion position 13.

Alternatively, the processor 110 may receive the designation of the range of at least three processing items 12 continuously executed in the common flow 11, and determine all the positions between the processing items 12 within the designated range as the insertion position 13. In this case, the processor 110 may produce the template data 10 including the information specifying the designated range as the information indicating the insertion position 13. Not only the insertion of the new processing item 12 but also the deletion of the existing processing item 12 may be permitted within the specified range.

§ 3 Appendix

As described above, the embodiment includes the following disclosure.

Configuration 1

A program executing device (100) including:
an acquisition unit (110, 152) configured to acquire first template data (10) indicating at least one designated processing item (12, 42, 52), first execution order of the at least one designated processing item (12, 42, 52), and a first insertion position (13) at which insertion of a new processing item is permitted in a first flow (11) in which the at least one designated processing item (12, 42, 52) is arranged according to the first execution order;
a production unit (154) configured to produce first additional data (20) indicating at least one additional processing item (22) and second execution order of the at least one additional processing item (22); and
a program executing unit (110, 156) configured to execute a program (30) in which a second flow (21) in which the at least one additional processing item (22) is arranged according to the second execution order is inserted at the first insertion position (13) in the first flow (11) based on the first template data (10) and the first additional data (20).

Configuration 2

The program executing device (100) described in configuration 1, wherein
the first template data (10) further indicates a default value and change propriety from the default value for each of at least one parameter required for execution of the at least one designated processing item (12),
the first additional data (20) further indicates a changed value for a parameter that can be changed from the default value in the at least one parameter, and
the program executing unit (110, 156) uses a value indicated by the first additional data (20) for the parameter that can be changed from the default value.

Configuration 3

The program executing device (100) described in configuration 2, wherein
the first template data (10) indicates a range of a value that can be set for the parameter that can be changed from the default value, and
the first additional data (20) indicates the value within the range for the parameter that can be changed from the default value.

Configuration 4

The program executing device (100) described in configuration 1, wherein
the first template data (10) is configured of:
second template data (40) indicating at least one first designated processing item (42), third execution order of the at least one first designated processing item (42), and N second insertion positions (43) at which insertion of a new processing item is permitted in a third flow (41) in which the at least one first designated processing item (42) is arranged according to the third execution order; and
second additional data (50) indicating at least one second designated processing item (52) and fourth execution order of the at least one second designated processing item (52) for each of M second insertion positions (43) selected from the N second insertion positions (43) and the M second insertion positions (43),
N is an integer greater than or equal to 2, M is a positive integer less than N, and
the first template data (10)
indicates the at least one first designated processing item (42) and the at least one second designated processing item (52) as the at least one designated processing item (12),
indicates execution order of the at least one first designated processing item (42) and the at least one second designated processing item (52) as the first execution order when a fourth flow (51) in which the corresponding at least one second designated processing item (52) is arranged according to the corresponding fourth execution order is inserted into each of the M second insertion positions (43) in the third flow (41), and
indicates an unselected second insertion position (43) in the N second insertion positions (43) as the first insertion position (13) when the fourth flow is inserted into each of the M second insertion positions (43) in the third flow (41).

Configuration 5

The program executing device (100) described in configuration 1, wherein
the first template data (10) is configured of:
second template data indicating at least one first designated processing item (42), third execution order of the at least one first designated processing item (42), and a second insertion position (43) at which insertion of a new processing item is permitted in a third flow (41) in which the at least one first designated processing item (42) is arranged according to the third execution order; and
second additional data (50) indicating at least one second designated processing item (52), fourth execution order of the at least one second designated processing item (52), and a third insertion position (53) at which insertion of a new processing item is permitted in a fourth flow (51) in which the at least one second designated processing item (52) is arranged according to the fourth execution order, and
the first template data (10)
indicates the at least one first designated processing item (42) and the at least one second designated processing item (52) as the at least one designated processing item (12),
indicates an execution order of the at least one first designated processing item (42) and the at least one second designated processing item (52) as the first execution order when the fourth flow (51) is inserted at the second insertion position (43) in the third flow (41), and
indicates the third insertion position (53) as the first insertion position (13) when the fourth flow (51) is inserted to the second insertion position (43) in the third flow (41).

Configuration 6

The program executing device (100) described in configuration 1, wherein the acquisition unit (110, 152) provides a user interface (300) that receives designation of selection of the at least one designated processing item (12) from a plurality of previously-prepared processing items, the first execution order, and the first insertion position (13), and produces the first template data (10) according to input to the user interface (300).

Configuration 7

The program executing device (100) described in configuration 6, wherein
the acquisition unit (110, 152) displays a plurality of objects (400, 402) on the user interface (300),
the plurality of objects (400, 402) include a first object (400) corresponding to each of the plurality of previously-prepared processing items and a second object (402) different from the first object,
the user interface (300) includes a work region (302) where the objects selected from the plurality of objects (400, 402) are disposed in designated order, and
the acquisition unit (110, 152)
sets the at least one designated processing item (12) based on a processing item corresponding to the first object (400) disposed in the work region (302), sets the first execution order based on order of the first object (400) disposed in the work region (302), and sets the first insertion position (13) based on order of the second object (402) disposed in the work region (302).

Configuration 8

The program executing device (100) described in configuration 6, wherein the acquisition unit (110, 152)

acquires second template data (40) indicating at least one first designated processing item (42), third execution order of the at least one first designated processing item (42), and N second insertion positions (43) at which insertion of a new processing item is permitted in a third flow (41) in which the at least one first designated processing item (42) is arranged according to the third execution order; and displays a plurality of objects (400) corresponding to the plurality of previously-prepared processing items on the user interface (300), the user interface (300) includes a work region (302) where objects selected from the plurality of objects (400) are disposed in designated order for each of M second insertion positions (43) selected from the N second insertion positions (43), N is an integer greater than or equal to 2, M is a positive integer less than N, for each of the M second insertion positions (43), the acquisition unit (110, 152)

sets at least one second designated processing item (52) based on the processing item corresponding to the object (400) disposed in the work region (302);

sets fourth execution order of the at least one second designated processing item (52) based on the order of the objects (400) disposed in the work region (302);

produces second additional data (50) indicating the at least one second designated processing item (52) and the fourth execution order; and produces the first template data (10) configured of the second template data (40) and the second additional data (50), and the first template data (10)

includes the at least one first designated processing item (42) and the at least one second designated processing item (52) as the at least one designated processing item (12);

indicates the execution order of the at least one first designated processing item (42) and the at least one second designated processing item (52) as the first execution order when a fourth flow (51) in which the corresponding at least one second designated processing item (52) is arranged according to the corresponding fourth execution order is inserted into each of the M second insertion positions (43) in the third flow (41); and indicates an unselected second insertion position (43) in the N second insertion positions (43) as the first insertion position (13) when the fourth flow is inserted into each of the M second insertion positions (43) in the third flow (41).

Configuration 9

The program executing device (100) described in configuration 6, wherein the acquisition unit (110, 152)

acquires second template data indicating at least one first designated processing item (42), third execution order of the at least one first designated processing item (42), and a second insertion position (43) at which insertion of a new processing item is permitted in a third flow (41) in which the at least one first designated processing item (42) is arranged according to the third execution order; and displays a plurality of objects (400, 402) on the user interface (300), the plurality of objects (400, 402) include a first object (400) corresponding to each of the plurality of previously-prepared processing items and a second object (402) different from the first object, the user interface (300) includes a work region (302) where objects selected from the plurality of objects (400, 402) are arranged in designated order, the acquisition unit (110, 152)

sets at least one second designated processing item (52) based on a processing item corresponding to the first object (400) disposed in the work region (302);

sets fourth execution order of the at least one second designated processing item (52) based on the order of the first object (400) disposed in the work region (302);

sets a third insertion position (53) at which insertion of a new processing item is permitted in a fourth flow (51) in which the at least one second designated processing item (52) is arranged according to the fourth execution order based on the order of the second object (402) disposed in the work region (302);

produces second additional data (50) indicating the at least one second designated processing item (52), the fourth execution order, and the third insertion position (53); and produces the first template data (10) including the second template data (40) and the second additional data (50), and the first template data (10)

indicates the at least one first designated processing item (42) and the at least one second designated processing item (52) as the at least one designated processing item (12);

indicates execution order of the at least one first designated processing item (42) and the at least one second designated processing item (52) as the first execution order when the fourth flow (51) is inserted at the second insertion position (43) in the third flow (41); and indicates the third insertion position (53) as the first insertion position (13) when the fourth flow (51) is inserted into the second insertion position (43) in the third flow (41).

Configuration 10

A program executing method including:

acquiring template data (10) indicating at least one designated processing item (12, 42, 52), first execution order of the at least one designated processing item (12, 42, 52), and a first insertion position (13) at which insertion of a new processing item is permitted in a first flow (11) in which the at least one designated processing item (12, 42, 52) is arranged according to the first execution order;

producing additional data (20) indicating at least one additional processing item (22) and second execution order of the at least one additional processing item (22); and executing a program (30) in which a second flow (21) in which the at least one additional processing item (22) is arranged according to the second execution order is inserted at the first insertion position (13) in the first flow (11) based on the template data (10) and the additional data (20).

Configuration 11

A program (150) causing a computer to execute the program executing method described in the configuration 10.

Although the embodiment of the present invention has been described, it should be considered that the disclosed embodiment is an example in all respects and not restrictive. The scope of the present invention is indicated by the claims, and it is intended that all modifications within the meaning and scope of the claims are included in the present invention.

REFERENCE SIGNS LIST

1: image processing system, 6: conveyance mechanism, 8: imaging unit, 10, 40: template data, 11: common flow, 12, 12a to 12e, 42, 42a, 42b, 52a to 52c: designated processing item, 13, 13a to 13c, 43, 43a, 43b, 53: insertion position, 20, 20A, 20B, 50: additional data, 21, 21A, 21B: individual flow, 22, 22a to 22d: additional processing item, 25, 26, 26a to 26c, 55, 56, 57: partial data, 30, 30A, 30B: image processing program, 41: first partial flow, 51, 51a: second partial flow, 51b: third partial flow, 100: image processing device, 102: display, 104: keyboard, 106: memory card, 110: processor, 112: RAM, 114: display controller, 116: system controller, 118: I/O controller, 120: hard disk, 122: camera interface, 124: input interface, 126: PLC interface, 128: communication interface, 130: memory card interface, 150: control program, 152: acquisition unit, 154: production unit, 156: program execution unit, 300: user interface, 302: work region, 304: object selection region, 306: camera image display region, 308: insertion/addition button, 310: order exchange button, 400, 400a to 400i, 402, 402a to 402c, 403, 403a to 403c: object, 500, 510: window, 502, 504, 512: input field, W: workpiece

The invention claimed is:

1. A program executing device comprising:
a processor; and
a memory storing instructions that, when executed by the processor, cause the processor to perform operations including:
acquiring first template data indicating at least one designated processing item, first execution order of the at least one designated processing item, and a first insertion position at which insertion of a new processing item is permitted in a first flow in which the at least one designated processing item is arranged according to the first execution order, the first template data indicating that insertion of a new processing item into a position other than the first insertion position is prohibited;
producing first additional data indicating at least one additional processing item and second execution order of the at least one additional processing item; and
executing a program in which a second flow in which the at least one additional processing item is arranged according to the second execution order is inserted at the first insertion position in the first flow based on the first template data and the first additional data, wherein acquiring the first template data includes:
providing a user interface that receives designation of selection of the at least one designated processing item from a plurality of previously-prepared processing items, the first execution order, and the first insertion position;
producing the first template data according to input to the user interface; and
displaying a plurality of objects on the user interface,
wherein the plurality of objects include a first object corresponding to each of the plurality of previously-prepared processing items and a second object different from the first object,
wherein the user interface includes i) a first work region where the objects selected from the plurality of objects are disposed in designated order and ii) an operating element for changing disposition order of the second object in the work region, and
wherein acquiring the first template data further includes:
setting the at least one designated processing item based on a processing item corresponding to the first object disposed in the work region;
setting the first execution order based on order of the first object disposed in the work region; and
setting the first insertion position based on order of the second object disposed in the work region.

2. The program executing device according to claim 1, wherein
the first template data further indicates a default value and change propriety from the default value for each of at least one parameter required for execution of the at least one designated processing item,
the first additional data further indicates a changed value for a parameter that can be changed from the default value in the at least one parameter, and
the instructions, when executed by the program, cause the processor to use a value indicated by the first additional data for the parameter that can be changed from the default value.

3. The program executing device according to claim 2, wherein
the first template data indicates a range of a value that can be set for the parameter that can be changed from the default value, and
the first additional data indicates the value within the range for the parameter that can be changed from the default value.

4. The program executing device according to claim 1, wherein
the first template data is configured of:
second template data indicating at least one first designated processing item, third execution order of the at least one first designated processing item, and N second insertion positions at which insertion of a new processing item is permitted in a third flow in which the at least one first designated processing item is arranged according to the third execution order; and
second additional data indicating at least one second designated processing item and fourth execution order of the at least one second designated processing item for each of M second insertion positions selected from the N second insertion positions and the M second insertion positions, wherein N is an integer greater than or equal to 2, M is a positive integer less than N, and
wherein the first template data;
  indicates the at least one first designated processing item and the at least one second designated processing item as the at least one designated processing item,
  indicates execution order of the at least one first designated processing item and the at least one second designated processing item as the first execution order when a fourth flow in which the corresponding at least one second designated processing item is arranged according to the corresponding fourth execution order is inserted into each of the M second insertion positions in the third flow, and
  indicates an unselected second insertion position in the N second insertion positions as the first insertion position when the fourth flow is inserted into each of the M second insertion positions in the third flow.

5. The program executing device according to claim 1, wherein
  the first template data is configured of:
    second template data indicating at least one first designated processing item, third execution order of the at least one first designated processing item, and a second insertion position at which insertion of a new processing item is permitted in a third flow in which the at least one first designated processing item is arranged according to the third execution order; and
    second additional data indicating at least one second designated processing item, fourth execution order of the at least one second designated processing item, and a third insertion position at which insertion of a new processing item is permitted in a fourth flow in which the at least one second designated processing item is arranged according to the fourth execution order, and
  wherein the first template data;
    indicates the at least one first designated processing item and the at least one second designated processing item as the at least one designated processing item,
    indicates an execution order of the at least one first designated processing item and the at least one second designated processing item as the first execution order when the fourth flow is inserted at the second insertion position in the third flow, and
    indicates the third insertion position as the first insertion position when the fourth flow is inserted to the second insertion position in the third flow.

6. The program executing device according to claim 1, wherein
  acquiring the first template data includes:
    acquiring a second template indicating at least one first designated processing item, third execution order of the at least one first designated processing item, and a second insertion position at which insertion of a new processing item is permitted in a third flow in which the at least one first designated processing item is arranged according to the third execution order;
    setting at least one second designated processing item based on aca processing item corresponding to the first object disposed in the work region;
    setting a fourth execution order of the at least one second designated processing item based on the order of the first object disposed in the work region;
    setting a third insertion position at which insertion of a new processing item is permitted in a fourth flow in which the at least one second designated processing item is arranged according to the fourth execution order based on the order of the second object disposed in the work region;
    producing second additional data indicating the at least one second designated processing item, the fourth execution order, and the third insertion position; and
    producing the first template data that is configured of the second template data and the second additional data, and
  wherein the first template data;
    indicates the at least one first designated processing item and the at least one second designated processing item as the at least one designated processing item;
    indicates execution order of the at least one first designated processing item and the at least one second designated processing item as the first execution order when the fourth flow is inserted at the second insertion position in the third flow; and
    indicates the third insertion position as the first insertion position when the fourth flow is inserted into the second insertion position in the third flow.

7. A program executing method comprising:
acquiring first template data indicating at least one designated processing item, first execution order of the at least one designated processing item, and a first insertion position at which insertion of a new processing item is permitted in a first flow in which the at least one designated processing item is arranged according to the first execution order, the first template data indicating that insertion of a new processing item into a position other than the first insertion position is prohibited;
producing additional data indicating at least one additional processing item and second execution order of the at least one additional processing item; and
executing a program in which a second flow in which the at least one additional processing item is arranged according to the second execution order is inserted at the first insertion position in the first flow based on the first template data and the additional data,
wherein acquiring the first template data includes:
  providing a user interface that receives designation of selection of the at least one designated processing item from a plurality of previously-prepared processing items, the first execution order, and the first insertion position;
  producing the first template data according to input to the user interface; and
  displaying a plurality of objects on the user interface,
wherein the plurality of objects include a first object corresponding to each of the plurality of previously-prepared processing items and a second object different from the first object,
wherein the user interface includes i) a first work region where the objects selected from the plurality of objects are disposed in designated order and ii) an operating element for changing disposition order of the second object in the work region, and
wherein acquiring the first template data further includes:
  setting the at least one designated processing item based on a processing item corresponding to the first object disposed in the work region:
  setting the first execution order based on order of the first object disposed in the work region; and setting the first insertion position based on order of the second object disposed in the work region.

8. The program executing method according to claim 7, wherein
the first template data further indicates a default value and change propriety from the default value for each of at least one parameter required for execution of the at least one designated processing item,
the first additional data further indicates a changed value for a parameter that can be changed from the default value in the at least one parameter, and
executing the program includes using a value indicated by the first additional data for the parameter that can be changed from the default value.

9. The program executing method according to claim 8, wherein
the first template data indicates a range of a value that can be set for the parameter that can be changed from the default value, and
the first additional data indicates the value within the range for the parameter that can be changed from the default value.

10. The program executing method according to claim 7, wherein
the first template data is configured of:
second template data indicating at least one first designated processing item, third execution order of the at least one first designated processing item, and N second insertion positions at which insertion of a new processing item is permitted in a third flow in which the at least one first designated processing item is arranged according to the third execution order; and
second additional data indicating at least one second designated processing item and fourth execution order of the at least one second designated processing item for each of M second insertion positions selected from the N second insertion positions and the M second insertion positions,
wherein N is an integer greater than or equal to 2, M is a positive integer less than N, and
wherein the first template data;
indicates the at least one first designated processing item and the at least one second designated processing item as the at least one designated processing item,
indicates execution order of the at least one first designated processing item and the at least one second designated processing item as the first execution order when a fourth flow in which the corresponding at least one second designated processing item is arranged according to the corresponding fourth execution order is inserted into each of the M second insertion positions in the third flow, and
indicates an unselected second insertion position in the N second insertion positions as the first insertion position when the fourth flow is inserted into each of the M second insertion positions in the third flow.

11. The program executing method according to claim 7, wherein
the first template data is configured of:
second template data indicating at least one first designated processing item, third execution order of the at least one first designated processing item, and a second insertion position at which insertion of a new processing item is permitted in a third flow in which the at least one first designated processing item is arranged according to the third execution order; and
second additional data indicating at least one second designated processing item, fourth execution order of the at least one second designated processing item, and a third insertion position at which insertion of a new processing item is permitted in a fourth flow in which the at least one second designated processing item is arranged according to the fourth execution order, and
wherein the first template data;
indicates the at least one first designated processing item and the at least one second designated processing item as the at least one designated processing item,
indicates an execution order of the at least one first designated processing item and the at least one second designated processing item as the first execution order when the fourth flow is inserted at the second insertion position in the third flow, and
indicates the third insertion position as the first insertion position when the fourth flow is inserted to the second insertion position in the third flow.

12. The program executing method according to claim 7, wherein
acquiring the first template data includes:
acquiring a second template indicating at least one first designated processing item, third execution order of the at least one first designated processing item, and a second insertion position at which insertion of a new processing item is permitted in a third flow in which the at least one first designated processing item is arranged according to the third execution order;
setting at least one second designated processing item based on a processing item corresponding to the first object disposed in the work region;
setting fourth execution order of the at least one second designated processing item based on the order of the first object disposed in the work region;
setting a third insertion position at which insertion of a new processing item is permitted in a fourth flow in which the at least one second designated processing item is arranged according to the fourth execution order based on the order of the second object disposed in the work region;
producing second additional data indicating the at least one second designated processing item, the fourth execution order, and the third insertion position; and
producing the first template data that is configured of the second template data and the second additional data, and
wherein the first template data:
indicates the at least one first designated processing item and the at least one second designated processing item as the at least one designated processing item;
indicates execution order of the at least one first designated processing item and the at least one second designated processing item as the first execution order when the fourth flow is inserted at the second insertion position in the third flow; and
indicates the third insertion position as the first insertion position when the fourth flow is inserted into the second insertion position in the third flow.

13. A non-transitory computer-readable storage medium storing a program causing a computer to execute the program executing method according to claim 7.

* * * * *